(12) United States Patent
Hamada et al.

(10) Patent No.: US 6,917,345 B2
(45) Date of Patent: Jul. 12, 2005

(54) SMALL ANTENNA AND MANUFACTURING METHOD THEREOF

(75) Inventors: Hiroki Hamada, Tokyo (JP); Yoshikazu Kamei, Tokyo (JP); Masayuki Ishiwa, Tokyo (JP); Isao Tomomatsu, Tokyo (JP); Takahiro Ueno, Tokyo (JP); Shinji Satoh, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 228 days.

(21) Appl. No.: 10/034,847

(22) Filed: Dec. 21, 2001

(65) Prior Publication Data

US 2002/0105479 A1 Aug. 8, 2002

(30) Foreign Application Priority Data

Dec. 26, 2000 (JP) ........................................ 2000-394929
Dec. 26, 2000 (JP) ........................................ 2000-394930

(51) Int. Cl.[7] ................................................. H01Q 1/38
(52) U.S. Cl. ............................. 343/895; 343/700 MS; 343/873
(58) Field of Search .......................... 343/700 MS, 702, 343/806, 872, 873, 895; 29/600

(56) References Cited

U.S. PATENT DOCUMENTS

| | | | |
|---|---|---|---|
| 5,087,920 A | | 2/1992 | Tsurumaru et al. |
| 5,448,250 A | | 9/1995 | Day |
| 5,448,252 A | * | 9/1995 | Ali et al. ............. 343/700 MS |
| 5,463,404 A | * | 10/1995 | Wall .................... 343/700 MS |
| 5,528,254 A | * | 6/1996 | Howng et al. ............... 343/873 |
| 5,764,198 A | * | 6/1998 | Tsuru et al. ................ 343/895 |
| 5,870,057 A | * | 2/1999 | Evans et al. ......... 343/700 MS |
| 5,870,065 A | * | 2/1999 | Kanba et al. ................ 343/895 |
| 5,870,066 A | * | 2/1999 | Asakura et al. ............. 343/895 |
| 5,892,490 A | * | 4/1999 | Asakura et al. ............. 343/895 |
| 5,898,413 A | | 4/1999 | Mandai et al. |
| 5,973,651 A | | 10/1999 | Suesada et al. |
| 6,064,351 A | * | 5/2000 | Mandai et al. ............. 343/873 |
| 6,075,491 A | | 6/2000 | Dakeya et al. |
| 6,133,880 A | | 10/2000 | Grangeat et al. |
| 6,304,220 B1 | | 10/2001 | Herve et al. |
| 6,308,894 B1 | * | 10/2001 | Hirai et al. .................. 235/492 |
| 6,320,545 B1 | | 11/2001 | Nagumo et al. |
| 6,323,811 B1 | | 11/2001 | Tsubaki et al. |
| 6,342,858 B1 | * | 1/2002 | Dakeya et al. ............. 343/702 |
| 6,359,589 B1 | | 3/2002 | Bae |
| 6,380,895 B1 | | 4/2002 | Moren et al. |
| 6,388,626 B1 | | 5/2002 | Gamalielsson et al. |
| 6,422,472 B1 | * | 7/2002 | Thevenot et al. ........... 235/492 |
| 6,466,174 B2 | * | 10/2002 | Haussler et al. ............ 343/702 |
| 6,630,906 B2 | * | 10/2003 | Tomomatsu et al. . 343/700 MS |
| 2002/0075186 A1 | * | 6/2002 | Hamada et al. ...... 343/700 MS |
| 2002/0080076 A1 | | 6/2002 | Kamei et al. |

FOREIGN PATENT DOCUMENTS

| | | |
|---|---|---|
| EP | 0762536 | 3/1997 |
| EP | 0825668 | 2/1998 |
| EP | 0997968 | 5/2000 |
| EP | 1098387 | 5/2001 |
| JP | 08097625 | 4/1996 |
| JP | 09036648 | 2/1997 |
| JP | 09051148 | 2/1997 |
| JP | 9-55618 | 3/1997 |
| JP | 9-64627 | 3/1997 |
| JP | 11122024 | 4/1999 |
| WO | WO 00/72404 | 11/2000 |

OTHER PUBLICATIONS

U.S. Appl. No. 09/909,912, filed Jul. 20, 2001.

* cited by examiner

*Primary Examiner*—Tan Ho
(74) *Attorney, Agent, or Firm*—Knobbe Martens Olson & Bear LLP

(57) ABSTRACT

A small antenna comprises an antenna conductor, and a dielectric chip formed at surroundings of the antenna conductor by a plurality of resin moldings.

30 Claims, 15 Drawing Sheets

SMALL ANTENNA AND MANUFACTURING METHOD THEREOF

CROSS-REFERENCE TO RELATED APPLICATION

This application is based upon and claims the benefit of priority from the prior Japanese Patent Applications No. 2000-394929, filed Dec. 26, 2000, and No. 2000-394930, filed Dec. 26, 2000, the entire contents of both of which are incorporated herein by reference.

BACKGROUND OF THE INVENTION

1. Field of the Invention

The present invention relates to a small antenna and manufacturing method thereof used for, for example, mobile telephone, personal digital assistant, and wireless LAN (local area network), etc.

2. Description of the Background Art

The miniaturization is requested to the antenna used for the mobile telephone etc., and various, small antennas are proposed so far.

A small antenna in which a meander antenna conductor is embedded in a dielectric chip is known as the above-mentioned small antenna (see, for example, Japanese Patent Application KOKAI Publication, No. 9-55618). This small antenna comprises a structure to accumulate three dielectric layers. A meander antenna conductor is formed on the surface of the dielectric layer located at the middle part by means of such as printing, evaporation and plating. Thereafter, a small antenna is formed by accumulating three dielectric layers, so that the dielectric layer, on which the antenna conductor is formed, is put between other dielectric layers. Thereby, the small antenna is configured.

The conventional antenna has a disadvantage that the manufacturing steps are complex as described above, and the cost rises.

BRIEF SUMMARY OF THE INVENTION

An object of the present invention is to provide a small antenna and a manufacturing method thereof in which the cost can be reduced.

The small antenna according to the first aspect of present invention is characterized by comprising: an antenna conductor; and a dielectric chip formed at surroundings of the antenna conductor by a plurality of resin moldings.

When the first resin molding is performed, a part of the antenna conductor can be fixed by the mold with the above-mentioned configuration. Therefore, the transformation of the antenna conductor when the molding is processed can be controlled. Therefore, a small antenna with good antenna characteristic and excellent quality can be obtained.

The manufacturing method of another small antenna according to the aspect of present invention is characterized by comprising: putting a antenna conductor between die faces of a first mold; molding a first resin part on the antenna conductor; putting the first resin part of the antenna conductor between die faces of a second mold; and molding a second resin part on the antenna conductor.

Since a part of the antenna conductor is put between the molds at the resin molding, the deformation of the antenna conductor during molding can be reduced according to the above-mentioned manufacturing method. Since the second molding is performed with the first resin part put between the die faces of the second mold, the position of the primary molding goods is steady. Therefore, the small antenna whose quality and accuracy are even can be efficiently manufactured.

DETAILED DESCRIPTION OF THE INVENTION

Figure 1A:
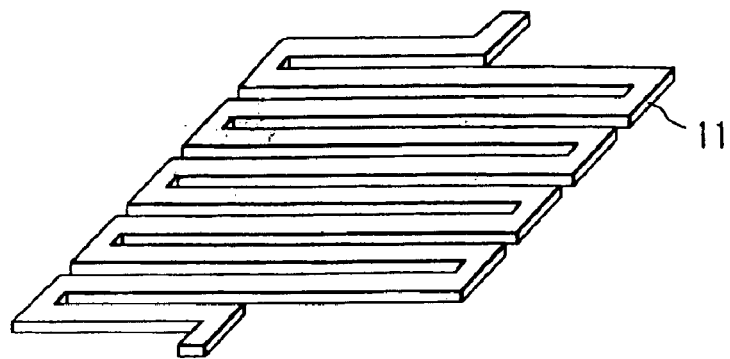
FIG. 1A to FIG. 1C are figures which show molding states in each molding step of the small antenna according to the first embodiment of the present invention.

Hereinafter, an embodiment of the present invention will be explained referring to the drawings. Though the shape of the antenna conductor is not limited in the following embodiments, it will be explained to assume that the antenna conductor is a meander conductor, basically.

(First Embodiment)

Figure 1B:
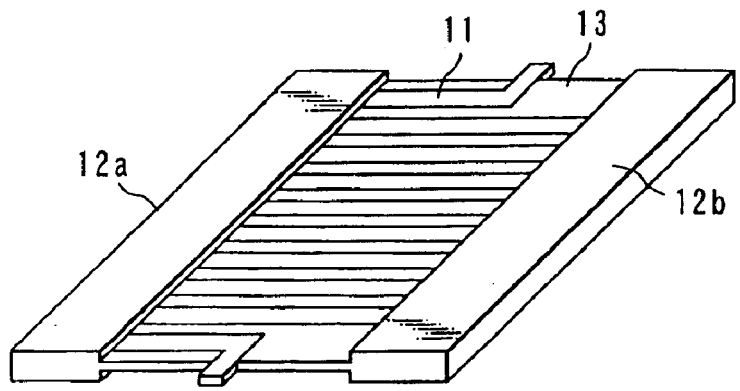
Figure 1C:
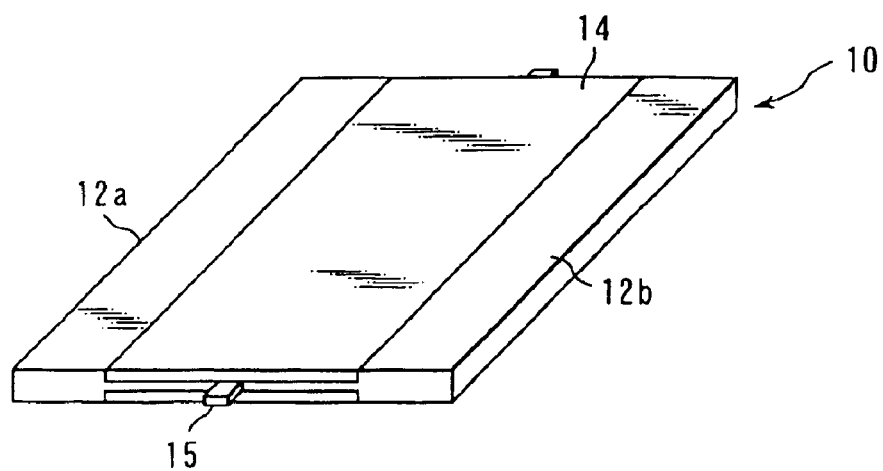
Figure 2A:
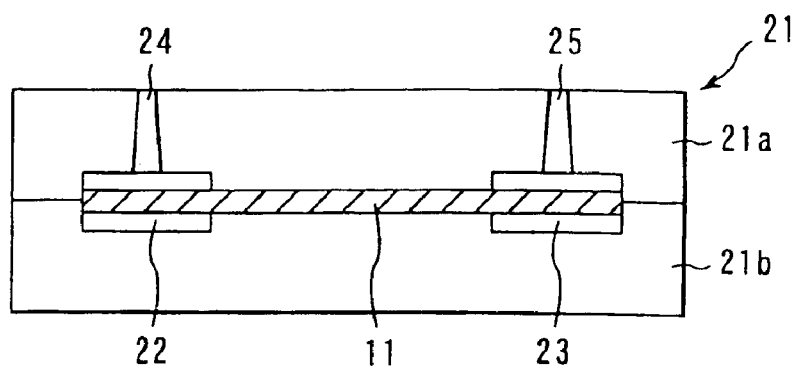
FIG. 2A and FIG. 2B are figures which show the molding step of the small antenna in the first embodiment.
Figure 2B:
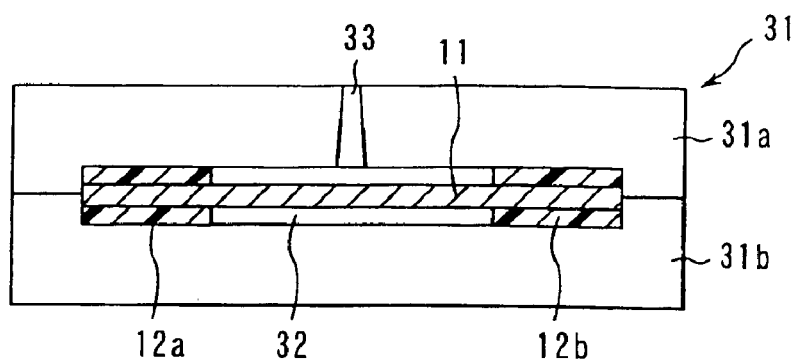

FIG. 1A to FIG. 1C are figures which show molding states in each molding step of the small antenna according to the first embodiment of present invention. FIG. 2A and FIG. 2B are figures which show a molding step of the small antenna in the first embodiment.

The small antenna according to the first embodiment is manufactured as follows.

For example, the antenna conductor 11 formed in the meander shape as shown in FIG. 1A is prepared. The length of the antenna conductor 11 is set in a ¼ wavelength, for example. It is preferable to use the conductor formed by piercing or etching processing from a metallic plate as the antenna conductor 11. The antenna conductor 11 may be formed by bending the wire rod.

The primary molding is performed by the mold 21 for primary molding shown in FIG. 2A. The mold 21 for primary molding has an upper mold 21a and a lower mold 21b. A part of the antenna conductor 11, for example, an intermediate part along the direction of the meander width, is put between the upper mold 21a and the lower mold 21b and is held by them. The cavities 22 and 23 for the resin molding are formed at the position corresponding to both ends along the direction of the meander width of the antenna conductor 11 held between the upper mold 21a and the lower mold 21b. The resin injection holes 24 and 25 which are led to the above-mentioned cavities 22 and 23 are formed on the upper mold 21a.

The primary molding of the antenna conductor 11 is performed as follows. An intermediate part along the direction of the meander width of the antenna conductor 11 is put between the die face of the upper mold 21a and the lower mold 21b. Then, the dielectric molding resin is injected into the cavities 22 and 23 from the resin injection holes 24 and 25. It is preferable to use the material with higher liquidity than the resin used at secondary molding described later as the molding resin used for the primary molds (PPS (polyphenylene sulfide) and liquid crystalline polymer with low loadings of ceramics powder). The molding resin can be injected into the cavities 22 and 23 with low pressure by the use of the resin with high liquidity. Therefore, the primary molding can be performed without ruining the meander shape of the antenna conductor 11. The liquidity can be compared by the melt flow rate.

FIG. 1B is a figure which shows a shape of the primary molding goods obtained by the primary molding processing. To the primary molding goods, the first resin parts 12a and 12b are formed at both ends along the meander width direction of the antenna conductor 11 in the total length of the pitch direction. The resin layer 13 with the same thickness as the antenna conductor 11 is formed at the middle part of the antenna conductor 11. This reason is as follows. The space is formed at the conductor surroundings in the part held by the mold 21 for primary molding, since the antenna conductor 11 has the meander shape. As a result, the resin layer 13 is formed so that the molding resin injected into cavity 22 and 23 turns to the space of the middle part of the antenna conductor 11.

As described above, when the antenna conductor 11 is primarily molded, the antenna conductor 11 is molded by putting the middle part thereof between the die faces of the upper the mold 21a and the lower the mold 21b. As a result, it is possible to integrate the antenna conductor 11 with the molding resin without deforming the meander shape of the antenna conductor 11.

Next, the secondary molding is performed for the primary molding goods by using the mold 31 for secondary molding shown in FIG. 2B. The mold 31 for secondary molding has an upper mold 31a and a lower mold 31b. The first resin parts 12a and 12b of the primary molding goods are put and is held by the upper mold 31a and the lower mold 31b. The cavity 32 for resin molding is formed to the upper mold 31a and the lower mold 31b at an intermediate part of the antenna conductor 11, that is, the position corresponding to a resin layer 13. The resin injection hole 33 which is led to the above-mentioned cavity 32 is formed to the upper mold 31a. The upper surface and the lower surface of the cavity 32 are formed to be positioned on the same plane as the first resin parts 12a and 12b.

The secondary molding of the primary molding goods is performed as follows. The first resin parts 12a and 12b of the primary molding goods are put between the die faces of the upper mold 31a and the lower mold 31b. Next, the dielectric molding resin is injected from the resin injection hole 33 in the cavity 32. The material with lower liquidity than the resin used at the primary molding can be used as the molding resin used at the secondary molding. This reason is as follows. In the primary molding goods, both ends of the antenna conductor 11 are fixed by the first resin parts 12a and 12b. Therefore, the secondary molding can be performed by controlling the deformation of the antenna conductor 11 even if the resin of lower liquidity than the resin used at the primary molding is used.

FIG. 1C is a figure which shows a shape of the secondary molding goods (finished goods) obtained by the secondary molding. In the secondary molding goods, the second resin layer 14 is formed at an intermediate part of the first resin parts 12a and 12b formed at both ends of the antenna conductor 11. The dielectric chip is formed by the first resin parts 12a, 12b, and the second resin part 14. In this case, an end of the antenna conductor 11 is projected from the second resin layer 4, and becomes the feeder terminal 15. Another end of the antenna conductor 11 is attached so as to be projected from the first resin part 12, too. When the antenna is attached to the circuit board, the projection edge is used as a support terminal.

The small antenna 10 is completed by the primary molding and the secondary molding. The first resin parts 12a and 12b, and the second resin layer 14 are smoothly formed on the same plane by the above-mentioned molding processing.

The middle part of the antenna conductor 11 is put between the die faces of the upper the mold 21a and the lower the mold 21b and the primary molding is performed according to the first embodiment. As a result, the first resin parts 12a and 12b can be formed while controlling the deformation of the meander shape into both ends along the meander width direction of the antenna conductor 11. And, it is possible to hold and integrate both ends of the antenna conductor 11 by the first resin parts 12a and 12b at the secondary molding. Therefore, it is possible to perform the secondary molding preventing the antenna conductor 11 from being deformed. In addition, even if the secondary molding is performed by using the resin with lower liquidity than the resin used at the primary molding, the deformation of the meander shape of the antenna conductor 11 is a little. In general, the resin with high dielectric (for example, resin that a large amount of ceramics are mixed with PPS, etc.) has low liquidity, and the deformation of the antenna conductor 11 can be controlled at the secondary molding in this case.

As described above, in the first embodiment, the primary molding and the secondary molding can be performed while controlling the deformation from initial shape of the antenna conductor 11. Therefore, it becomes possible to manufacture the small antenna 10 whose the antenna characteristic is good, and whose quality becomes complete. Since the small antenna 10 can be easily manufactured by the resin processing which uses the mold, the cost can be lowered.

The upper surface and the lower surface of the first resin parts 12a and 12b are provided at the same position in a direction in the plane including meander width direction and meander pitch direction of the antenna conductor 11. As a result, since it is possible to use the first resin parts 12a and 12b as a pressure at the secondary molding, the secondary molding can be performed without independently especially forming the material for pressure. In this case, all of the upper surface and the lower surface of the first resin parts 12a and 12b need not be provided in symmetry. If a part of the first resin parts 12a and 12b are on the corresponding position of the upper surface and the lower surface, it is possible to use the part as a pressure at the secondary molding.

There is an advantage in which the primary molding goods can be set easily in the mold 31 for secondary molding, since the first resin part is provided on both sides in the first embodiment.

Figure 3A:
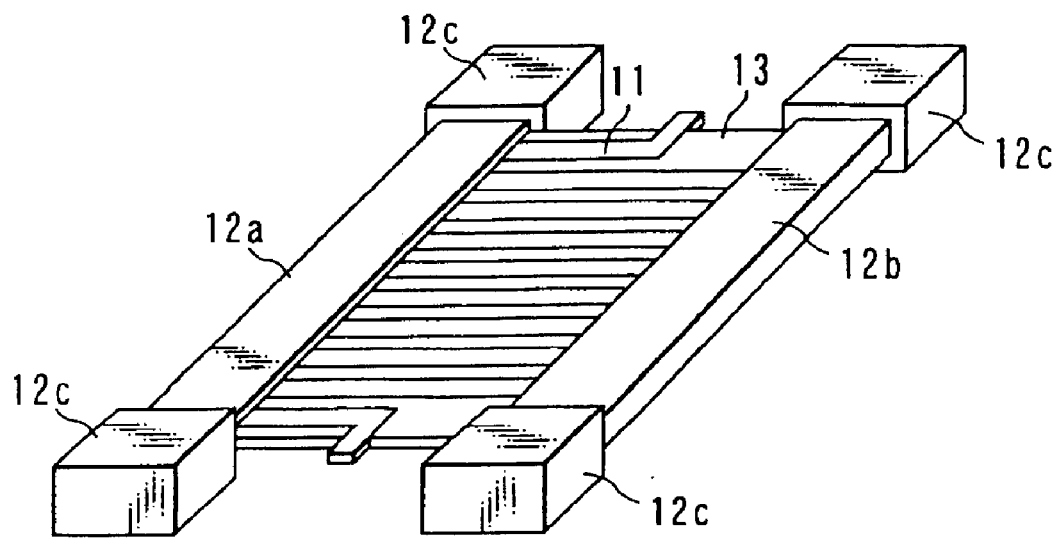
FIG. 3A and FIG. 3B are figures which show the example when the pressure projection is formed in the first resin part and the molding processing is performed in the first embodiment.
Figure 3B:
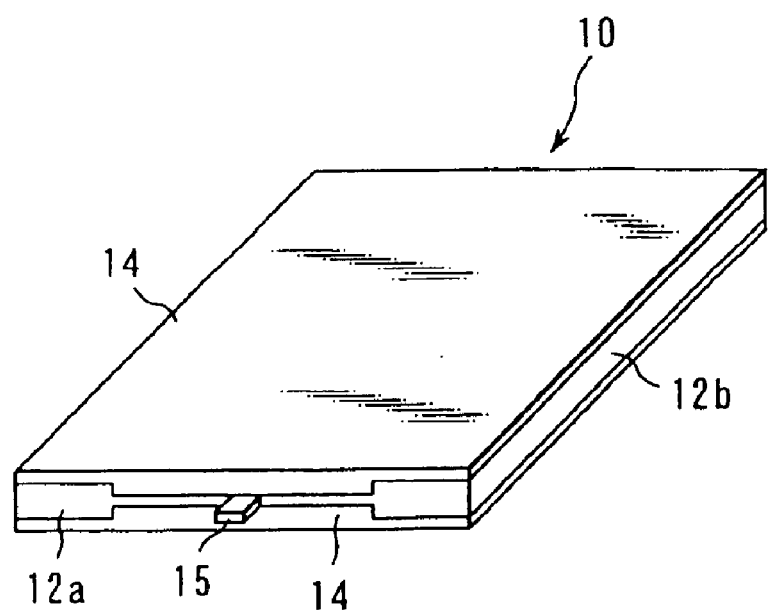

The secondary molding can be performed by forming the pressure projection 12c on the sides of the first resin parts 12a and 12b at the primary molding and using the pressure projection 12c as shown in FIG. 3A. If the pressure projection 12c is cut after the secondary molding is completed, the product shown in FIG. 3B is completed.

The pitch direction may be changed though pitch direction of the meander of the antenna conductor is directed to one direction in this embodiment (similar in the following embodiments).

(Second Embodiment)

The second embodiment of the present invention will be explained referring to FIG. 4A to FIG. 5B. The same marks are fixed to the same parts as the first embodiment and a detailed explanation will be omitted.

Figure 5A:
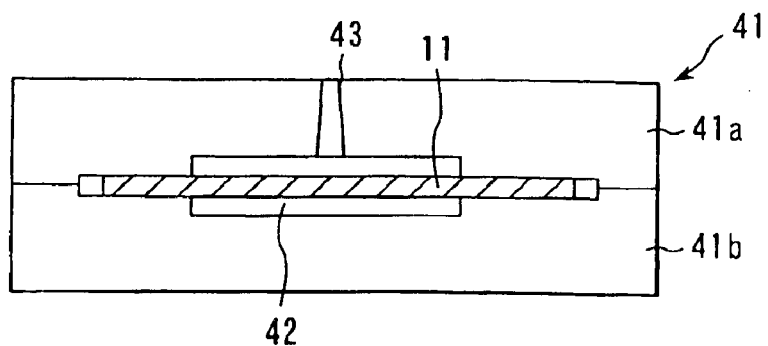
FIG. 5A and FIG. 5B are figures which show the molding step of the small antenna in the second embodiment.
Figure 5B:
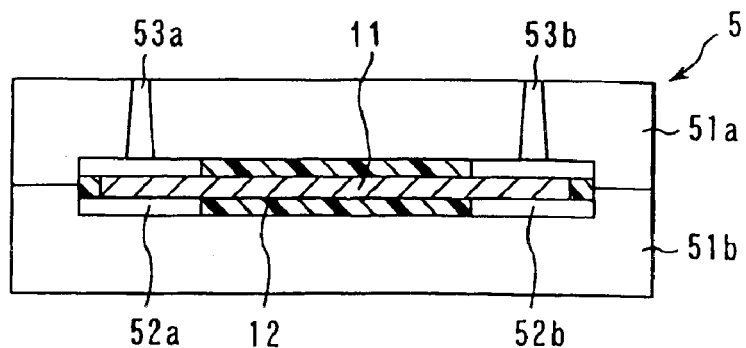
Figure 4A:
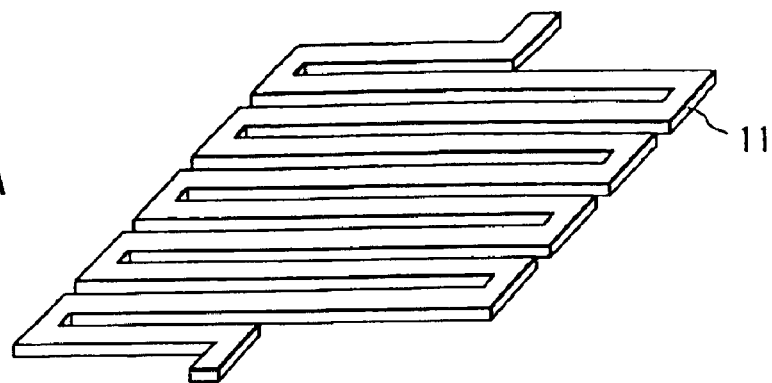
FIG. 4A to FIG. 4C are figures which show molding states in each molding step of the small antenna according to the second embodiment of the present invention.
Figure 4B:
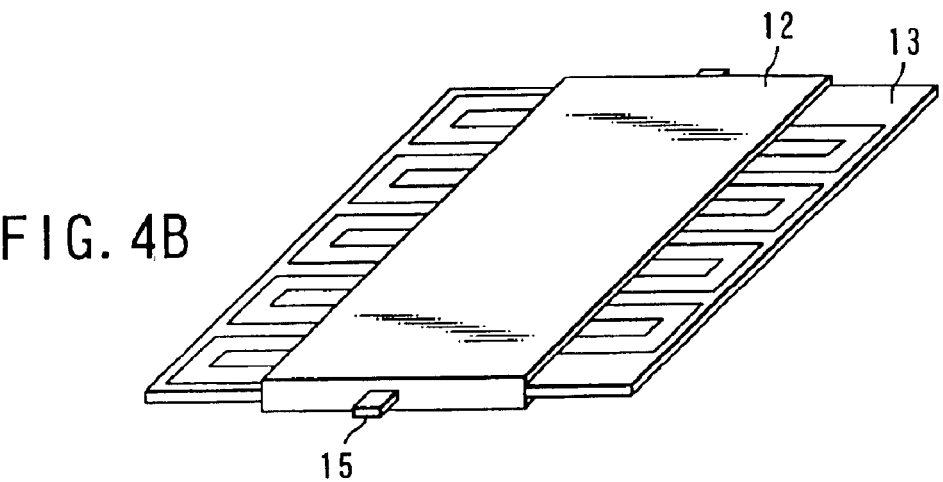
Figure 4C:
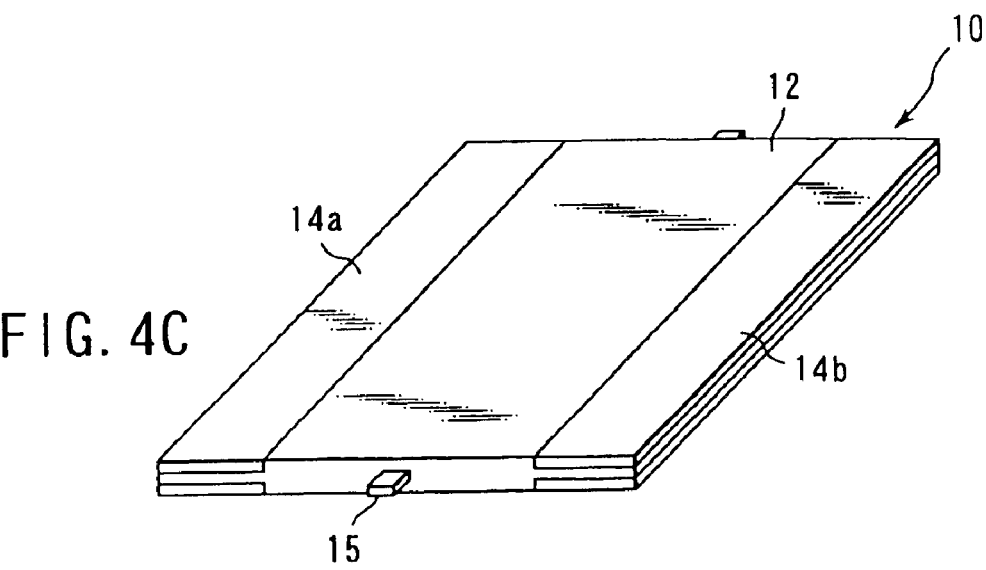

FIG. 4A to FIG. 4C are figures which show molding states in each molding step when the small antenna is manufactured according to the second embodiment of present invention. FIG. 5A and FIG. 5B are figures which show moldings step in the second embodiment.

The small antenna 10 according to the second embodiment of the present invention is configured as shown from FIG. 4A to FIG. 4C. That is, the first resin part 12 is formed on an intermediate part along the meander width direction of the antenna conductor 11. The second resin layers 14a and 14b are formed on other parts except the first resin part 12, that is, on both ends along the meander width direction of the antenna conductors 11.

The mold 41 for primary molding shown in FIG. 5A and the mold 51 for secondary molding shown in FIG. 5B are used, when the small antenna according to the second embodiment is manufactured.

The mold 41 for primary molding comprises an upper mold 41a and a lower mold 41b as shown in FIG. 5A. Both ends along the meander width direction of the antenna conductor 11 are put and held by the upper mold 41a and the lower mold 41b. The cavity 42 for resin molding is formed on an intermediate part of the upper mold 41a and the lower mold 41b. The resin injection hole 43 which is led to the above-mentioned cavity 42 is formed on the upper mold 41a.

The primary molding is performed as follows. An intermediate part along the meander width direction of the antenna conductor 11 is put between the die faces of the upper mold 41a and the lower mold 41b. Next, the molding resin is injected from the resin injection hole 43 into the cavity 42. It is preferable to use the material with high liquidity as the molding resin used at the primary molding as well as the case of the first embodiment. The molding resin can be injected in the cavity 42 by low pressure by the use of the resin with high liquidity as the molding resin. Therefore, the deformation of the meander shape of the antenna conductor 11 can be more reduced.

FIG. 4B is a figure which shows a shape of the primary molding goods to which primary molding processing is performed. In the primary molding goods, the first resin part 12 is formed on an intermediate part along the meander width direction of the antenna conductor 11. In this case, an end of the antenna conductor 11 is projected from the first resin part 12 to the side thereof and becomes the feeder terminal 15. The resin layer 13 with the same thickness as the antenna conductor 11 is formed at both ends of the antenna conductor 11. This reason is as follows. Since the antenna conductor 11 has the meander shape, the spaces are formed at surrounding of the conductor on both ends which are held by the mold 41 for primary molding. As a result, the resin layer 13 is formed so that the molding resin injected into the cavity 42 turns into the space at both ends of the antenna conductor 11. The resin layer 13 is formed to the outer side from both ends of the antenna conductor 11.

The mold 51 for secondary molding holds an intermediate part along the meander width direction of the antenna conductor 11, that is, the part in the first resin part 12 by the upper mold 41a and the lower mold 41b as show in FIG. 5B. The cavities 52a and 52b for resin molding are formed at both ends of the mold 51 for secondary molding. The resin injection holes 53a and 53b which are led to the above-mentioned cavities 52a and 52b are formed in the upper mold 51a.

The secondary molding of the antenna conductor 11 which uses the mold 51 for secondary molding is performed as follows. The first resin part 12 of the primary molding goods is put between the die faces of the upper mold 51a and the lower mold 51b. Next, the molding resin is injected from the resin injection holes 53a and 53b into the cavities 52a and 52b. The material with lower liquidity than the resin used at the primary molding can be used as the molding resin used at the secondary molding as well as the case of the first embodiment.

FIG. 4C is a figure which shows a shape of the secondary molding goods (finished goods) to which the secondary molding is processed. In the secondary molding goods, the second resin layers 14a and 14b are formed on both ends of the first resin part 12 formed at an intermediate part of the antenna conductor 11.

The small antenna 10 is completed by the primary molding processing and the secondary molding processing. The first resin part 12 and the second the resin layer 14a and 14b are smoothly formed on the same plane by the processing of the above-mentioned molding. Each of molding resins 12a, 12b, and 14 can be used as an exterior of the small antenna 10 as it is.

The primary molding and the secondary molding can be performed while controlling the deformation from the initial shape of the antenna conductor 11 as well as the first embodiment according to the second embodiment. Therefore, it becomes possible to manufacture the small antenna 10 whose antenna characteristic is good, and whose quality becomes complete. Since the small antenna 10 can be easily manufactured by the resin processing which uses the mold, the cost can be lowered.

(Third Embodiment)

The third embodiment of the present invention will be explained referring to FIG. 6A to FIG. 6C. The same marks are fixed to the same parts as the first embodiment and the detailed explanation will be omitted.

Figure 6A:
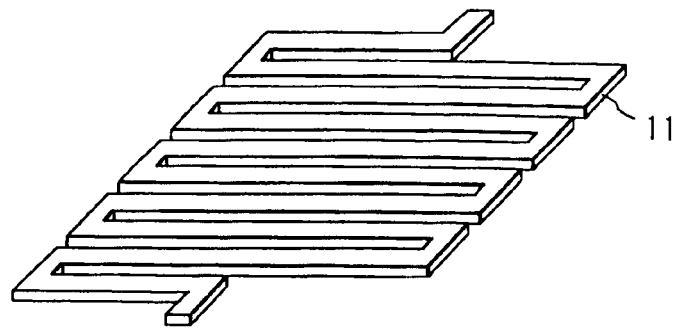
FIG. 6A to FIG. 6C are figures which show molding states in each molding step of the small antenna according to the third embodiment of the present invention.
Figure 6B:
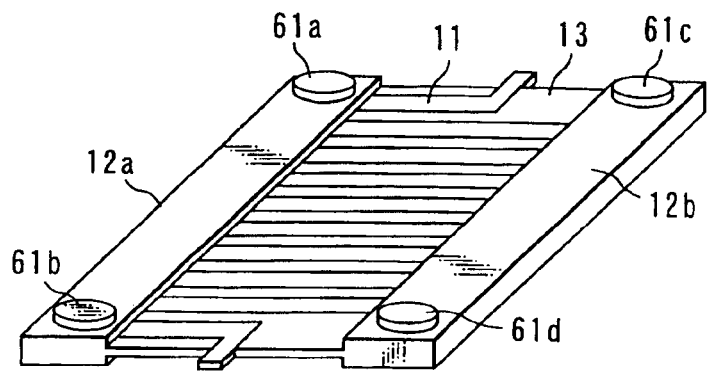
Figure 6C:
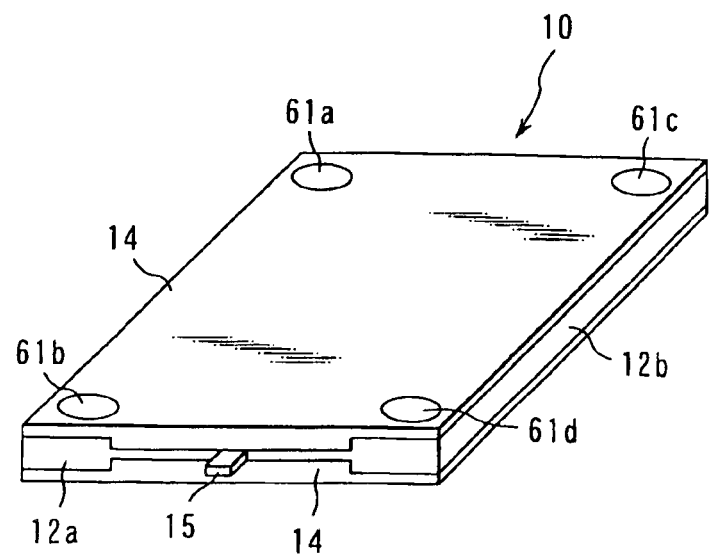

FIG. 6A to FIG. 6C are figures which show molding states in each molding step when the small antenna is manufactured according to the third embodiment of present invention.

In the small antenna 10 according to the third embodiment of the present invention, the first resin parts 12a and 12b are formed at both ends along the meander width direction of the antenna conductor 11 as well as the first embodiment at the primary molding. In the third embodiment, the disk-shaped bosses 61a to 61d (projection parts) are further formed at four corners on both sides of the first resin parts 12a and 12b, for example.

The disk-shaped bosses 61a to 61d of the primary molding goods is held by an upper and lower mold at the secondary molding. Then, the second resin layer 14 is formed to become the same plane to the disk-shaped bosses 61a to 61d in the entire both surfaces of the antenna conductor 11 including the first resin parts 12a and 12b.

The same advantages as the first embodiment can be achieved according to the third embodiment. In addition, since the second resin layer 14 is formed by combining with the disk-shaped bosses 61a to 61d of the first resin parts 12a and 12b, the antenna with excellent strength can be provided. In addition, the second resin layer 14 is formed on entire surfaces of both sides of the antenna, the antenna with fine sight can be provided.

(Fourth Embodiment)

The fourth embodiment of the present invention will be explained referring to FIG. 7A and FIG. 7B. The same marks are fixed to the same parts as the first embodiment and the detailed explanation will be omitted.

Figure 7A:
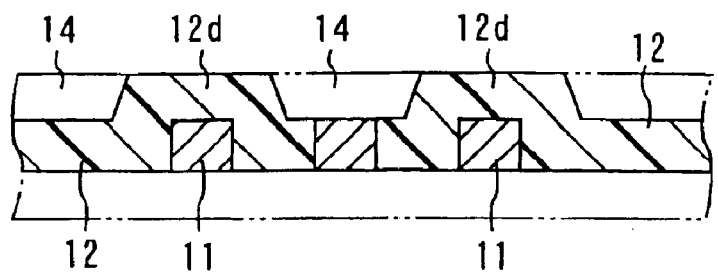
FIG. 7A and FIG. 7B are sectional and upper views which show the state at the first molding of the small antenna according to the fourth embodiment of the present invention.
Figure 7B:
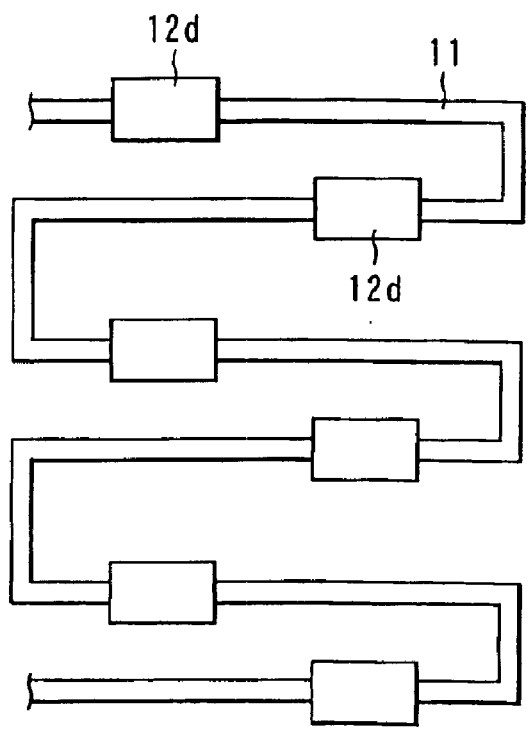

FIG. 7A is a sectional view which shows the state at the primary molding of the small antenna according to the fourth embodiment of the present invention and FIG. 7B is an upper figure of FIG. 7A. At the primary molding of the antenna, the first resin part 12 is formed between conductors of each antenna conductor 11 and a surface at one side in the fourth embodiment. In this case, the first resin part 12 comprises island parts 12d partially formed as shown in FIG. 7A and FIG. 7B. The island parts 12d are parts provided to flow the resin in the intervals between antenna conductors 11 so that the intervals thereof are joined. Even when the island parts 12d are formed over the antenna conductor 11, any shapes etc. may be adapted arbitrarily, if the initial shape of the antenna conductor 11 can be held.

Figure 8:
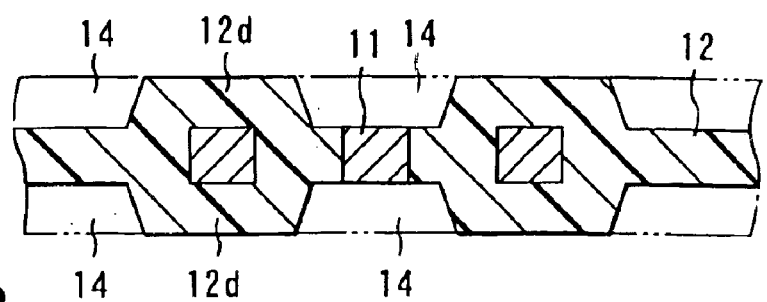
FIG. 8 is a sectional view which shows an example when the island parts are formed to be projected to the front and rear surfaces in the first resin layer in the fourth embodiment.

The second resin layer 14 is formed on both sides of the antenna at the secondary molding after the first resin part 12 is formed on the antenna conductor 11. The antenna conductor is hardly held at the secondary molding, when the island parts 12d of the first resin part 12 are formed on another surface of the antenna conductor 11. However, the secondary molding can be performed by using the pressure projection by providing the second pressure projection shown in FIG. 3A on the side of the first resin part 12 at the primary molding. The small antenna 10 is completed by cutting the second pressure projection after the secondary molding is completed. The island parts 12d can be used as the pressure at the secondary molding by forming the island parts 12d of the first resin part 12 so that the island parts 12d are projected to the front surface and the rear surface thereof as shown in FIG. 8.

It is of course products can be completed with many times molding, such as three or four molding times, though when the product is completed by two times moldings of the primary molding and the secondary molding, in the first to fourth embodiments.

According to each above-mentioned embodiment, since the dielectric is formed with two or more times resin moldings for the antenna conductor, the molding can be performed by controlling the deformation from initial shape of the antenna conductor. Therefore, it becomes possible to obtain the small antenna whose antenna characteristic is good, and whose quality becomes complete. In addition, the small antenna with excellent mass production can be manufactured cheaply.

(Fifth Embodiment)

Figure 9A:
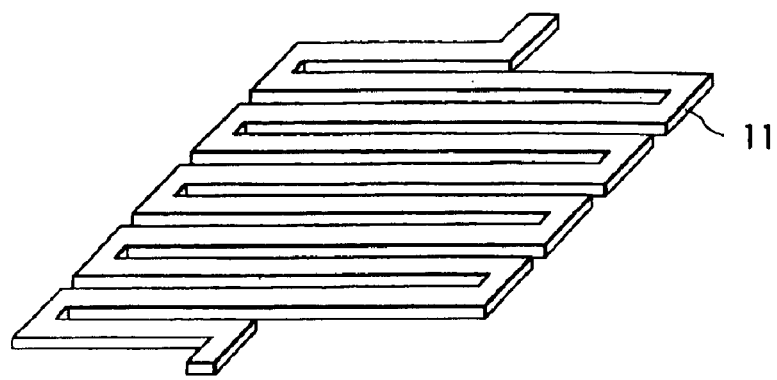
FIG. 9A to FIG. 9C are figures which show molding states in each molding step of the small antenna according to the fifth embodiment of the present invention.
Figure 9B:
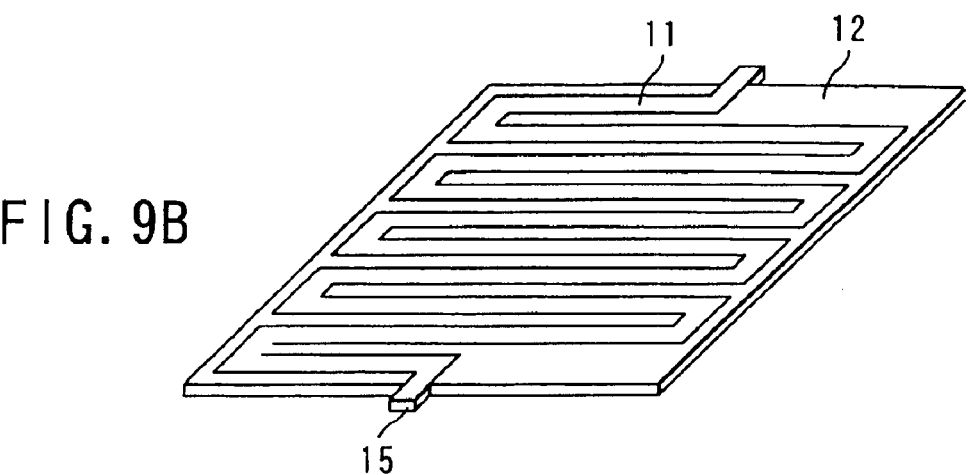
Figure 9C:
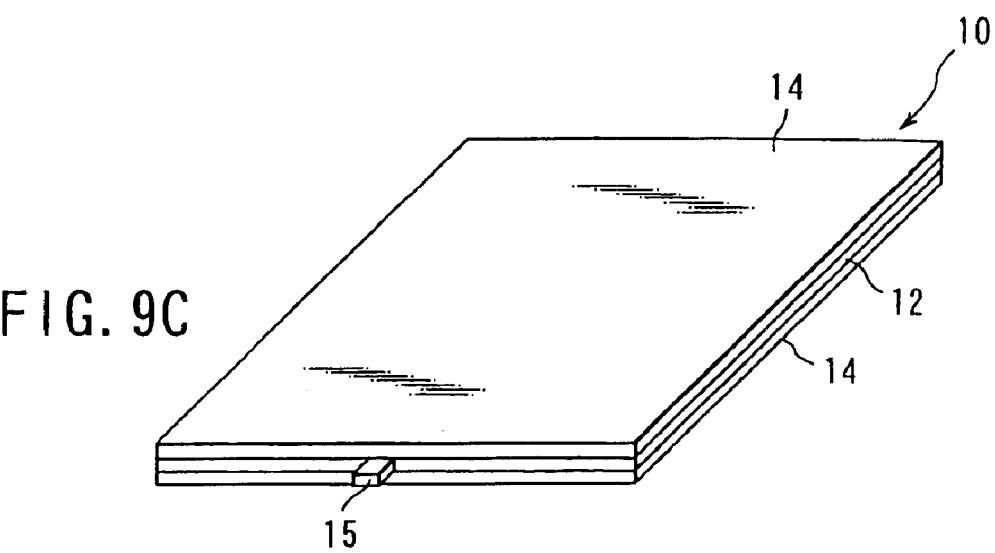

FIG. 9A to FIG. 9C are figures which show molding states in each molding step of the small antenna according to the fifth embodiment of present invention. The same marks are fixed to the same parts as the first embodiment and the detailed explanation will be omitted.

Figure 10:
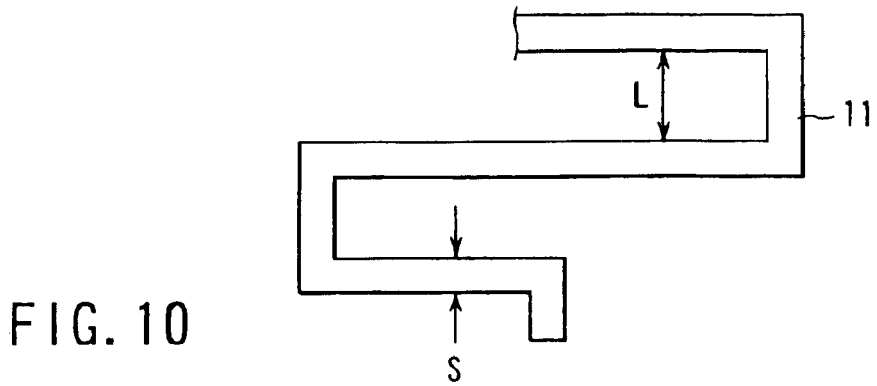
FIG. 10 is a figure which shows a relation between a width between conductors of the antenna conductor and a width of the conductor in the fifth embodiment.

The small antenna 10 according to the fifth embodiment uses the antenna conductor 11 formed in the meander shape as shown in FIG. 9A, for example. A width L between conductors is set wider than a conductor width S as shown in FIG. 10.

The upper and lower surfaces of the antenna conductor 11 are put between the die faces of the upper mold and the lower mold of the mold for primary molding and is primarily molded by using the low dielectric materials whose permittivity $\in$ is about 2.0 to 4.5, for instance, PPS (polyphenylene sulfide) and liquid crystalline polymers, then the first resin part 12 is formed along between each conductor of antenna conductor 11 and the circumference thereof as shown in FIG. 9B. The first resin part 12 is formed to the same thickness as the antenna conductor 11.

The primary molding goods are set in the mold for secondary molding and is secondarily molded. At this secondary molding, the high dielectric material whose permittivity $\in$ is about 6.0 to 20 is used and the second resin layer 14 is formed on the upper and lower surfaces of the first resin layer 12 as shown in FIG. 9C. The material that ceramics are mixed with, for example, the above-mentioned PPS etc. is used as the above-mentioned high dielectric material.

(Sixth Embodiment)

The sixth embodiment of the present invention will be explained referring to FIG. 11. In the sixth embodiment, the same marks are fixed to the same parts as the first embodiment and the detailed explanation will be omitted.

Figure 11:
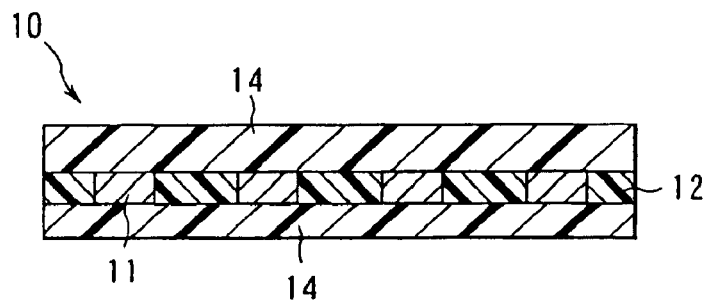
FIG. 11 is a sectional view of the small antenna according to the sixth embodiment of the present invention.

FIG. 11 is a sectional view which shows the configuration of the small antenna 10 according to the sixth embodiment of the present invention. In FIG. 11, the second resin part 14 is formed with the high dielectric material, for example, like the square. And, the meander antenna conductor 11 is arranged between two second resin parts 14. The first resin part 12 having a low permittivity bonding material is formed between each conductor of the antenna conductor 11 and is formed at the circumference thereof. Two second resin parts 14 and the antenna conductor 11 are bonded through the first resin part 12. That is, the second resin parts 14 and the antenna conductor 11 are accumulated, and are integrally configured by being bonded with the bonding material which becomes the first resin part 12.

In the small antenna 10 according to the sixth embodiment, the resonance frequency can be lowered while miniaturizing the antenna and a wide frequency band can be obtained as well as the case of the fifth embodiment.

The bonding material may be remained thinly between the second resin part 14 and the antenna conductor 11.

EXAMPLE OF EXPERIMENTAL MANUFACTURE

An example when the small antenna 10 in the sixth embodiment is actually made for trial purposes will be explained. In this example of the experimental manufacture, the high dielectric material with permittivity ∈ of 7.8 is used as the second resin part 14. An epoxy base bonding material whose permittivity ∈ is 3.5 is used as a bonding material which becomes the first resin part 12. The antenna conductor 11 having the pattern shown in FIG. 12 is used as the antenna conductor 11.

The small antenna 10 actually manufactured is hexahedron of 4 mm in width, 8 mm in length, and 1 mm in thickness. The antenna conductor 11 has a first meander part 31, a second meander part 32 and a broad part 33 as shown in FIG. 12. The traveling directions of the meander conductors of the first meander part 31 and the second meander part 32 are different as shown by arrows 30a and 30b. In an example of this case, the first meander part 31 and the second meander part 32 are arranged so that the traveling directions of the first meander part 31 and the second meander part 32 are orthogonal. The broad part 33 almost formed like a triangle is connected to the tip of the second meander part 32.

Two terminals 34 and 35 are provided at the first meander part 31. The terminal 34 is used as a feeder terminal. Another terminal 35 is not especially used, and a mono-pole feeder method is adapted. A width a of the first meander part 31 is 3.2 mm, a distance b from the first meander part 31 to the rear end of the broad part 33 is 3.8 mm, a length c of the broad part 33 is 2.2 mm, and a width d (maximum width) at the rear end of the broad part 33 is 3 mm. The maximum width d of the broad part 33 is set in an equal value to the total width d of the first meander part 31 and the second meander part 32. A conductor width S of the antenna conductor 11 is 0.2 mm, and a width L between conductors is 0.2 mm.

Figure 12:
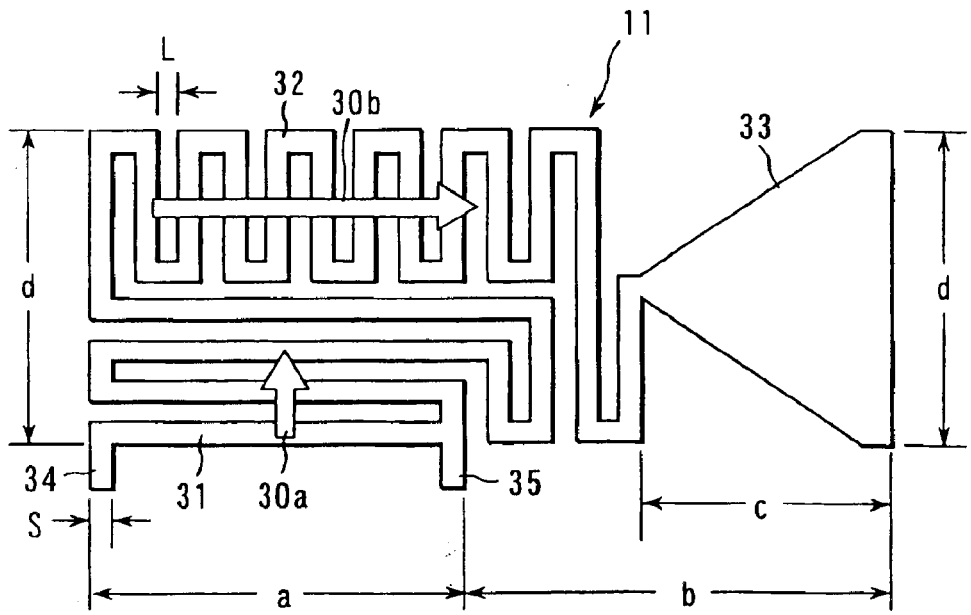
FIG. 12 is a figure which shows an example of the pattern of the antenna conductor used for the example of the experimental manufacture of the present invention.

The antenna conductor 11 of the pattern shown in FIG. 12 can be used as inverted-F feeder method. That is, the terminal 34 provided to the first meander part 31 may be used as a ground terminal, and the other terminal 35 may be used as a feeder terminal.

Figure 13:
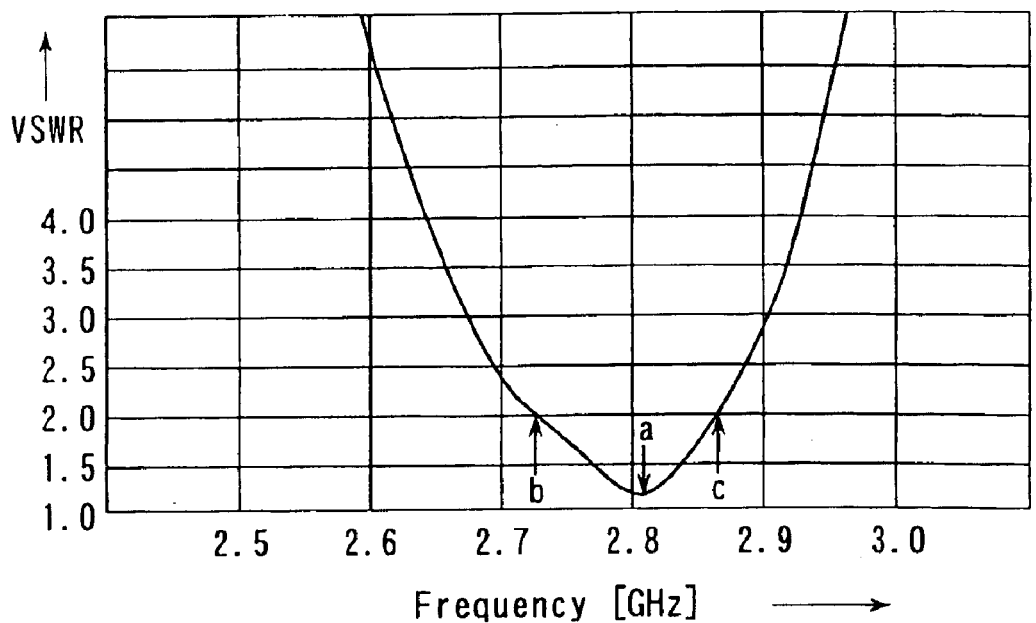
FIG. 13 is a figure which shows the frequency characteristic of the small antenna of the example of the experimental manufacture of the present invention.

FIG. 13 is a figure which shows a frequency characteristic of the small antenna 10 shown in the above-mentioned example of the experimental manufacture. In FIG. 13, the horizontal axis is frequency (GHz), and the vertical axis is VSWR (voltage standing-wave ratio). In the small antenna 10, a center frequency of the point a is "2.805 GHz", the frequencies of the points b and c in which VSWR becomes "2" are "2.725 GHz" and "2.865 GHz", and the ratio width thereof is 5% as shown in the frequency characteristic of FIG. 13.

Figure 14:
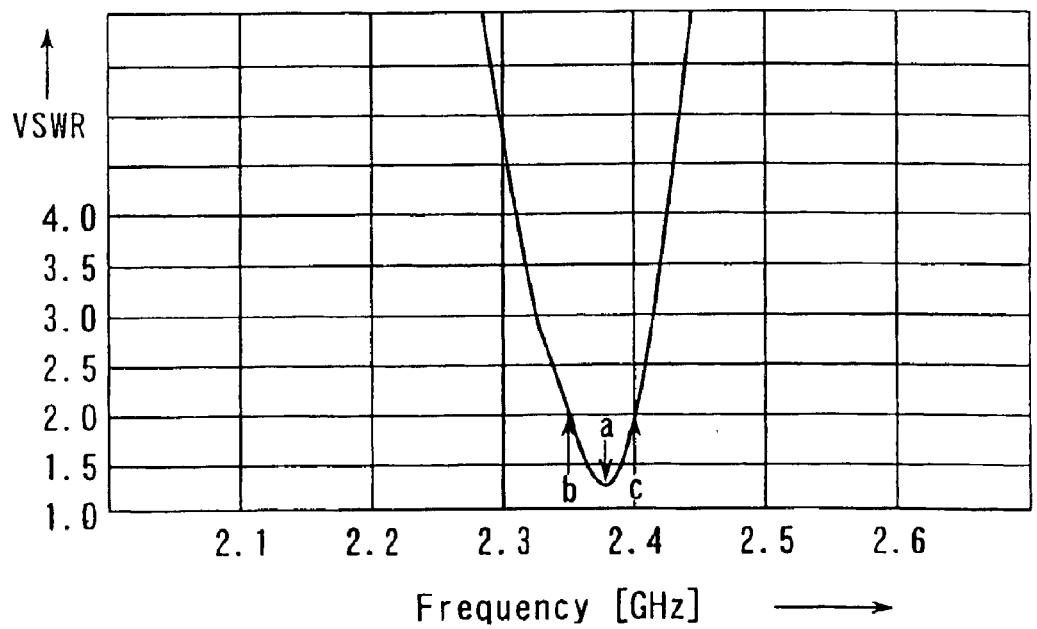
FIG. 14 is a figure which shows the frequency characteristic of the small antenna manufactured by a conventional method.

FIG. 14 is a figure to compare a characteristic between a comparative small antenna and the small antenna 10, and is a figure which shows a frequency characteristic of the comparative small antenna. In FIG. 14, the axis of horizontal axis is frequency (GHz), and the vertical axis is VSWR as well as FIG. 13. The comparative small antenna uses the antenna conductor 11 of the same pattern as the antenna conductor 11 used in the above-mentioned example of the experimental manufacture. The small antenna is a hexahedron of 4 mm in width, 8 mm in length and 1 mm in thickness in which the antenna conductor is embedded in the dielectric chip consisting only of the high dielectric material whose permittivity ∈ is 7.8. The center frequency of the point a is "2.375 GHz" as shown in the frequency characteristic of FIG. 14, the frequencies of the point b and the point c in which VSWR becomes "2" are "2.347 GHz" and "2.401 GHz" in the comparative small antenna, and the ratio width thereof is 2.3%.

The small antenna 10 shown by the above-mentioned example of the experimental manufacture has twice or more wide frequency band compared with the small antenna manufactured in a conventional method as apparent from the frequency characteristic shown in FIG. 13 and FIG. 14.

(Seventh Embodiment)

The seventh embodiment of the present invention will be explained referring to FIG. 15A to FIG. 15C. The same marks are fixed to the same parts as the first embodiment and the detailed explanation will be omitted.

Figure 15A:
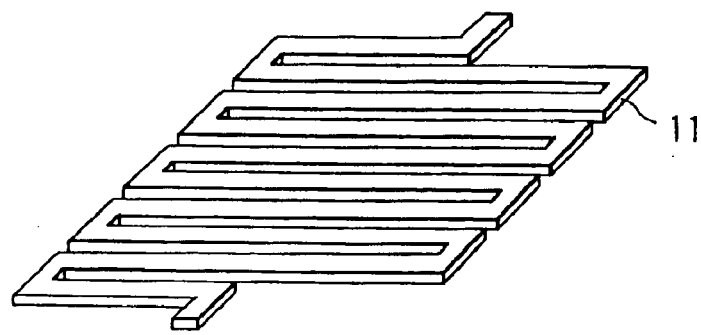
FIG. 15A to FIG. 15C are figures which show molding states in each molding step of the small antenna according to the seventh embodiment of the present invention.
Figure 15B:
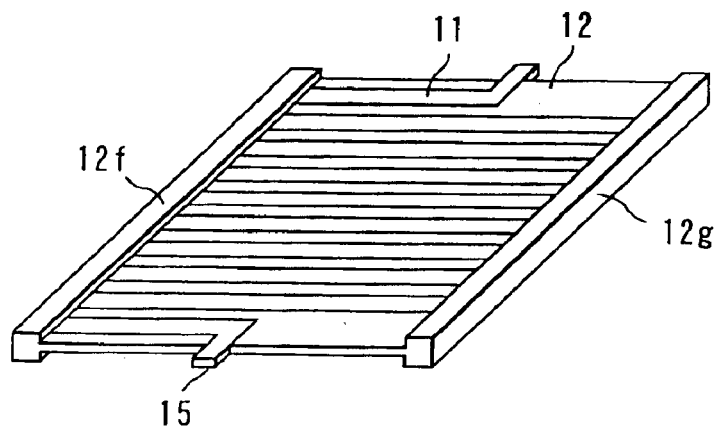
Figure 15C:
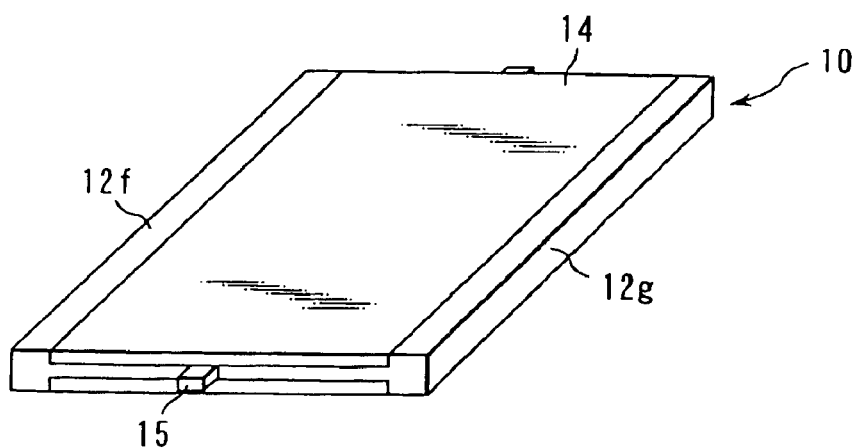

FIG. 15A to FIG. 15C are figures which show molding states in each molding step of the small antenna 10 according to the seventh embodiment of present invention. In the seventh embodiment, the antenna conductor 11 shown in FIG. 15A is primarily molded with the low dielectric material, the first resin part 12 is formed between each conductor of the antenna conductor 11 as shown in FIG. 15B. In addition, both ends of the first resin part 12, that is, the part along the both sides of the meander width direction of the antenna conductor 11 (being parallel to the traveling direction meander) are projected to the upper surface and the lower surface and the integral molding parts 12f and 12g are formed.

The secondary molding of the primary molding goods is performed as follows. The integral molding parts 12f and 12g of the first resin part 12 are put between the die faces of the upper mold and the lower mold of the mold for secondary molding. Next, the secondary molding is performed by using the high dielectric material. That is, the second resin part 14 having the same height as that of the integral molding parts 12f and 12g are formed on both surfaces of the first resin part 12 as shown in FIG. 15C. In the seventh embodiment, it is preferable to prevent the faced areas of the antenna conductor 11 and the second resin part 14 from reducing so much by forming the width of the integral molding parts 12f and 12g as narrow as possible, unlike the first embodiment.

Even when the integral molding parts 12*f* and 12*g* is provided on the first resin part 12 as described above, the antenna characteristic equal to the first embodiment can be obtained.

In the seventh embodiment, the integral molding parts 12*f* and 12*g* are provided on the first resin part 12 along the both sides of the meander width direction of the antenna conductor 11. As a result, the secondary molding can be performed by holding the integral molding parts 12*f* and 12*g* on the die faces of the mold for secondary molding. Therefore, the secondary molding becomes easy. It becomes possible to hold both sides along the meander width direction of the antenna conductor 11 more strongly by the integral molding parts 12*f* and 12*g* of the first resin part 12. Therefore, the second processing can be performed while the antenna conductor 11 is kept in the state of initial shape. As a result, the small antenna 10 whose quality becomes complete can be manufactured easily and cheaply. In addition, the integral molding parts 12*f* and 12*g* are formed along the meander pitch direction of the antenna conductor 11 in the small antenna 10. Therefore, the resin can flow into between conductors through the integral molding parts 12*f* and 12*g* at the primary molding. Therefore, the small antenna 10 according to the seventh embodiment has the advantage of an easy primary molding.

In the seventh embodiment, the second resin part 14 is provided to be located between the integral molding parts 12*f* and 12*g* of the first resin part 12. In addition, it is of course the second resin part 14 may be provided to also cover, for example, the integral molding parts 12*f* and 12*g* of the first resin part 12.

(Eighth Embodiment)

The eighth embodiment of the present invention will be explained referring to FIG. 16A to FIG. 16C. The same marks are fixed to the same parts as the first embodiment and the detailed explanation will be omitted.

Figure 16A:
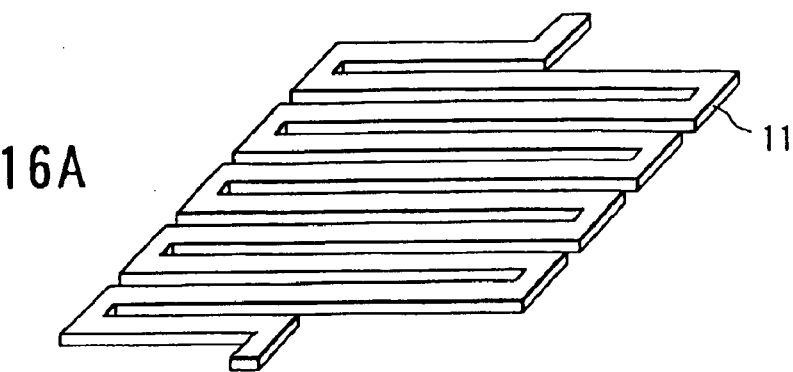
FIG. 16A to FIG. 16C are figures which show molding states in each molding step of the small antenna according to the eighth embodiment of the present invention.
Figure 16B:
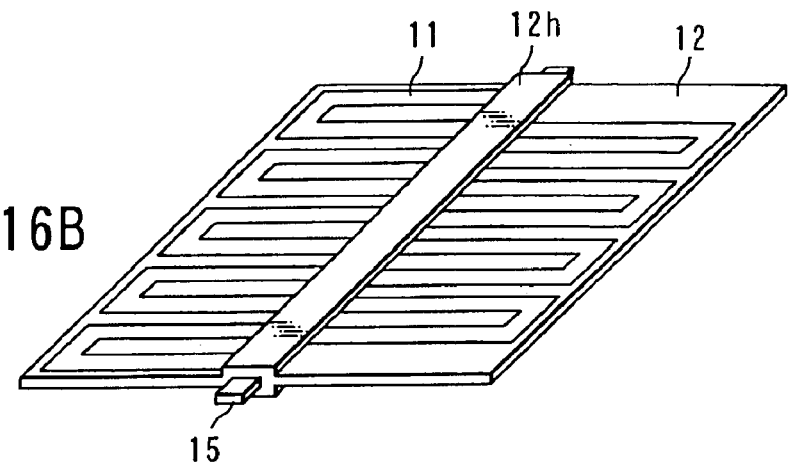
Figure 16C:
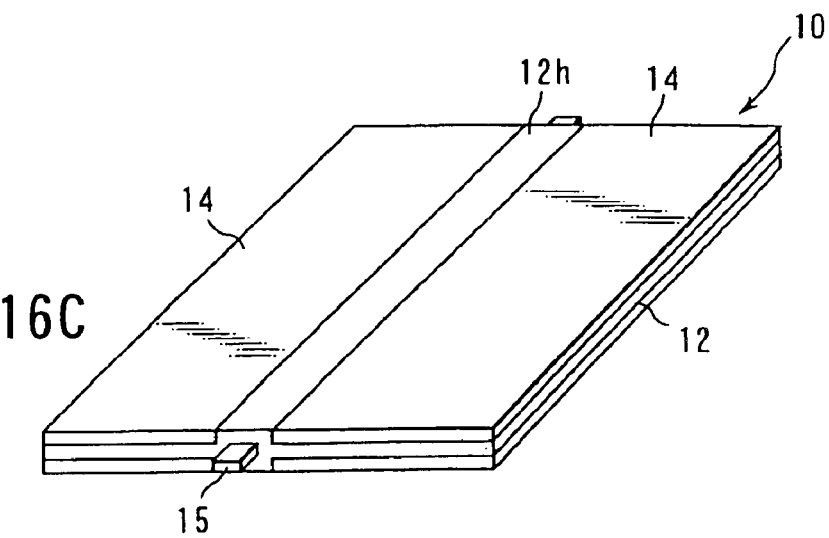
Figure 17A:
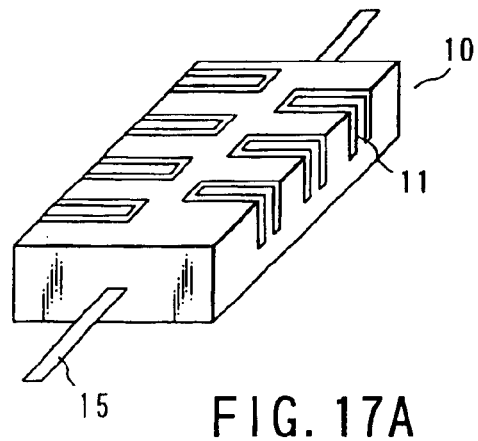
FIG. 17A and FIG. 17B are figures to explain the problem of the conventional manufacturing method.
Figure 17B:
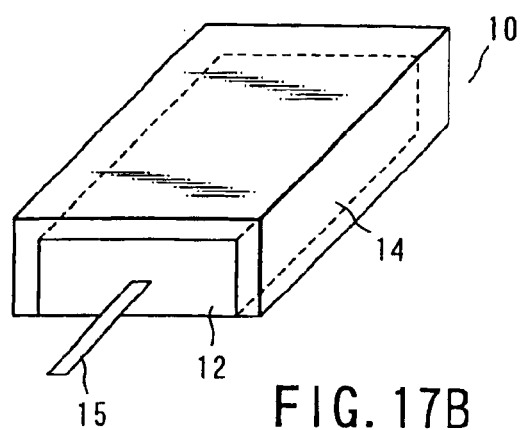

FIG. 16A to FIG. 16C are figures which show the molding states in each molding step of the small antenna 10 according to the eighth embodiment of the present invention. When the antenna conductor 11 shown in FIG. 16A is primarily molded by the low dielectric material, the first resin part 12 is formed between each conductor of the antenna conductor 11 and are formed at the circumference as shown in FIG. 16B in the eighth embodiment. In addition, the integral molding part 12*h* is formed along the pitch direction on an intermediate part of the first resin part 12, that is, on an intermediate part of the meander width direction of the antenna conductor 11.

The secondary molding is performed as follows. The integral molding part 12*h* of the first above-mentioned resin part 12 of the primary molding goods is put between the die faces of the upper mold and the lower mold of the mold for secondary molding. Next, the secondary molding is performed by using the high dielectric material. That is, the second resin part 14 with the same height as the integral molding part 12*h* is formed on both surfaces of the first resin part 12 as shown in FIG. 16C. It is preferable to prevent the faced areas of the antenna conductor 11 and the second resin part 14 from reducing so much by forming the first resin part 12 so that the width of the integral molding part 12*h* as narrow as possible.

Even if the integral molding part 12*h* is provided at an intermediate part of the first resin part 12 along the pitch direction of the antenna conductor 11 as described above, the antenna characteristic equal to the first embodiment can be obtained.

In the eighth embodiment, there is an advantage such that the secondary molding becomes easy, since the secondary molding can be performed by holding the integral molding part 12*h* on the die face of the mold for secondary molding as well as the seventh embodiment by providing the integral molding part 12*h* at an intermediate part of the first resin part 12.

In the eighth embodiment, the second resin part 14 is formed so that the second resin part 14 is located on both sides of the integral molding part 12*h* molded on the first resin part 12.

The second resin part 14 may be provided to also cover the integral molding part 12*h* of the first resin part 12.

(Ninth Embodiment)

The ninth embodiment of the present invention will be explained referring to FIG. 17A to FIG. 20. In the ninth embodiment, the same marks are fixed to the same parts as the first embodiment, and the detailed explanation will be omitted.

Figure 18:
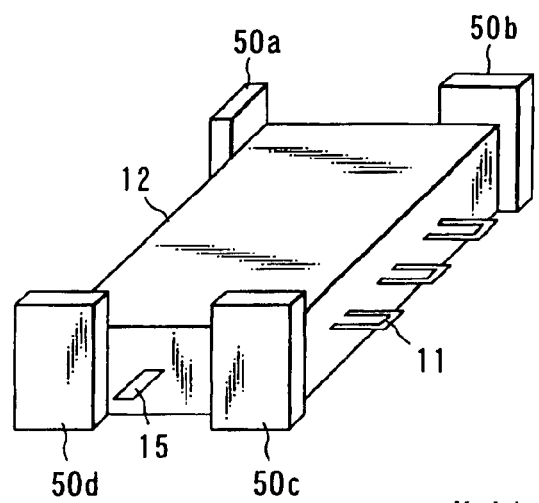
FIG. 18 is a perspective view of the primary molding goods of the small antenna according to the ninth embodiment of the present invention.
Figures 19A, 19B:
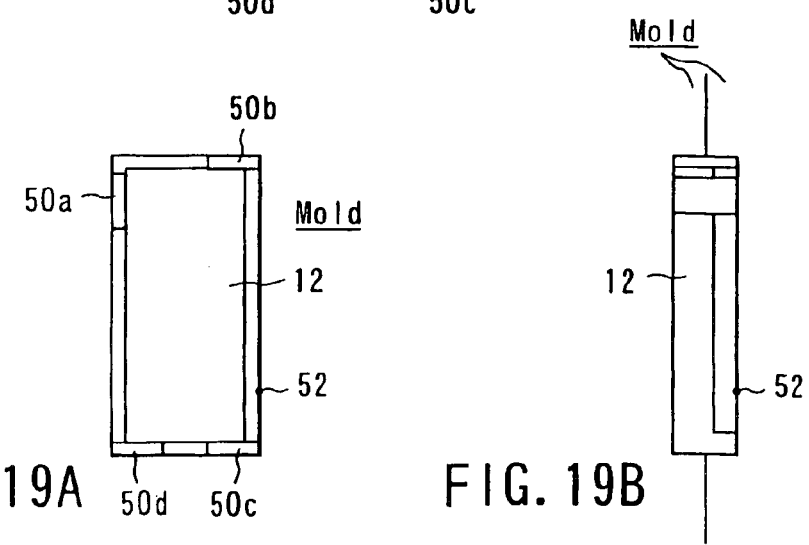
FIG. 19A and FIG. 19B are figures when the primary molding goods of FIG. 18 are set to the metal mold for the secondary molding.

In the ninth embodiment, when the primary molding goods are molded as shown in FIG. 18, the positioning projection parts 50*a* to 50*d* are also molded at four corners of the first resin part 12 at the same time. The primary molding goods are surely positioned in the mold for secondary molding as shown in FIG. 19A and FIG. 19B and the positioning projection parts 50*a* to 50*d* are molded at primary molding. Specifically, the height of the positioning projection parts 50*a* to 50*d* are formed in the same height as that of cavity 52 formed in the mold 51 for secondary molding. The primary molding goods is formed so that an outside size of the primary molding goods including the positioning projection parts 50*a* to 50*d* may become equal to an outside size of the secondary molding goods. As a result, each inner surface of the cavity 52 of the mold for secondary molding has a state in which that the part of the first molding goods is contact thereto. The second resin part 14 is formed at the space between the first resin part 12 and the inner surface of the cavity 52 of the mold for secondary molding. It is preferable that the positioning projection parts 50*a* to 50*d* are formed to be positioned to almost agree to four corners of the cavities 52*a* and 52*b* in the mold 51 for secondary molding. Though three positioning projection parts 50*b*, 50*c*, and 50*d* are located at the corners of cavity 52, the remaining positioning projection part 52*a* is shifted from the corner, as shown in FIG. 19A in this embodiment. The reason why the position of positioning projection part 50*a* is shifted is that the positioning projection part 50*a* is separated from the gate position of the mold for primary molding. Therefore, if the position of the gate is adjusted to other positions, the positioning projection parts 50*a* to 50*d* can be formed to agree to the four corners of the cavities 52*a* and 52*b*.

Figure 20:
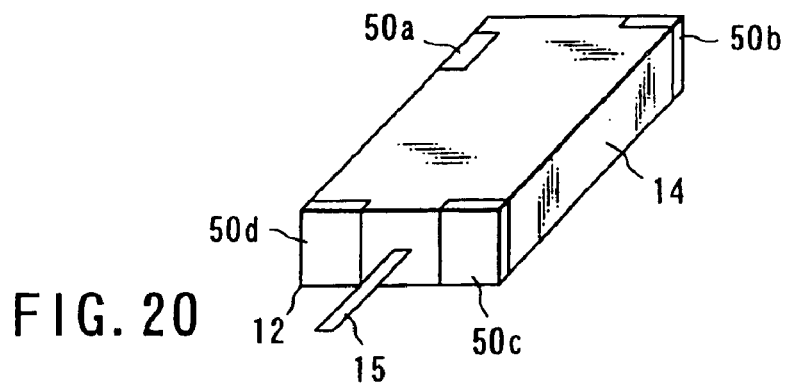
FIG. 20 is a figure which shows an outline of the small antenna 10 after secondary molding in the ninth embodiment.

FIG. 20 is a figure which shows a general view of the small antenna 10 after the secondary molding. The outer surface of the positioning projection parts 50*a* to 50*d* of the first resin part 12 and the second resin part 14 form the outer surface of the antenna.

As described above, the positioning projection parts 50*a* to 50*d* are formed at primary molding, and the primary molding goods is fixed vertically and horizontally by the positioning projection parts 50*a* to 50*d* not to move at the secondary molding. Therefore, the second resin 14 is not molded to be biased and the antenna conductor 11 is prevented from being exposed from the second resin 14.

(Tenth Embodiment)

The tenth embodiment of the present invention will be explained referring to FIG. 21A to FIG. 23B. In the tenth embodiment, the same marks are fixed to the same parts as the first embodiment, and the detailed explanation will be omitted.

Figure 21A:
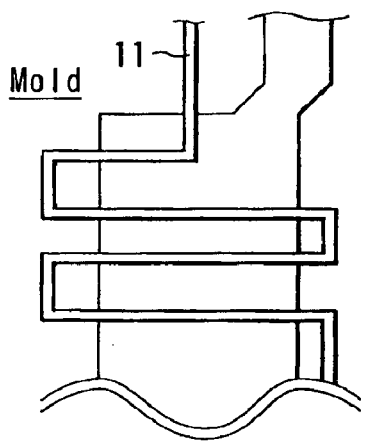
FIG. 21A and FIG. 21B are figures to explain the problem of the conventional manufacturing method.
Figure 21B:
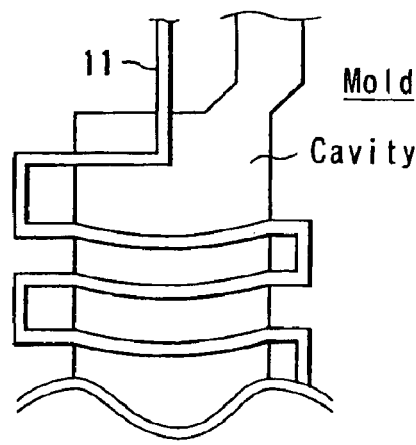

In each above-mentioned embodiment, the resin is filled to the middle part of the antenna conductor 11 in a state that both ends along the meander width direction of the antenna conductor 11 shown in FIG. 21A is put between the die faces of the mold at the primary molding to prevent the antenna conductor 11 being deformed. However, the conductor is some deformed by the flow of the resin at filling (see FIG. 21B).

Figure 22:
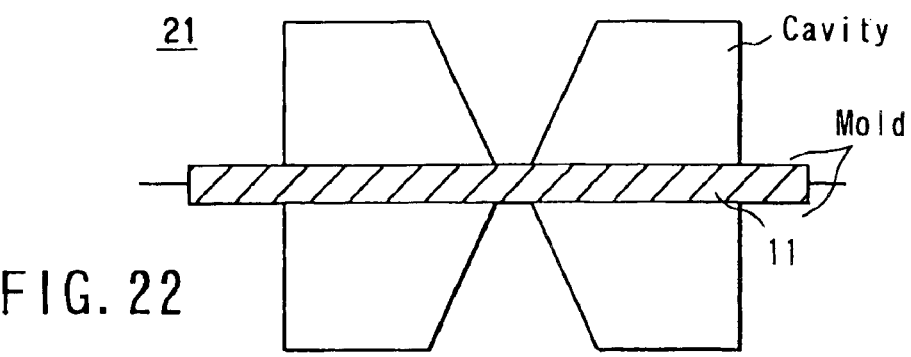
FIG. 22 is a sectional view which shows the case where the antenna conductor is set in the metal mold for the first molding in the tenth embodiment.
Figure 23A:
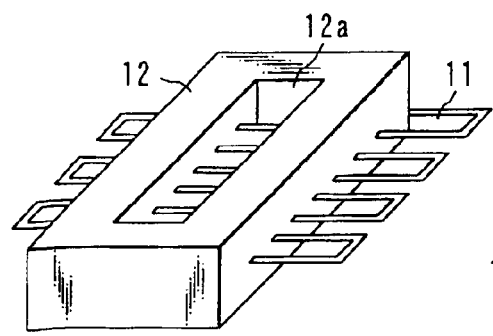
FIG. 23A and FIG. 23B are perspective and sectional views of the primary molding goods molded in FIG. 22.
Figure 23B:
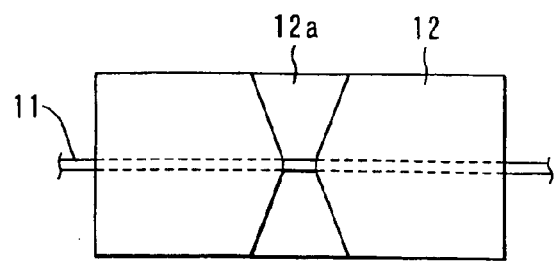

To solve this disadvantage, in the tenth embodiment, both of both end sides along the meander width direction and the middle part of the antenna conductor 11 are pressed with the mold 21 for primary molding and the primary molding goods are formed at the primary molding as shown in FIG. 22. The perspective view of the primary molding goods formed thus is shown in FIG. 23A. The sectional view of the primary molding goods is shown in FIG. 23B. The penetration hole 12a is formed at the middle part of the primary molding goods.

Figure 24A:
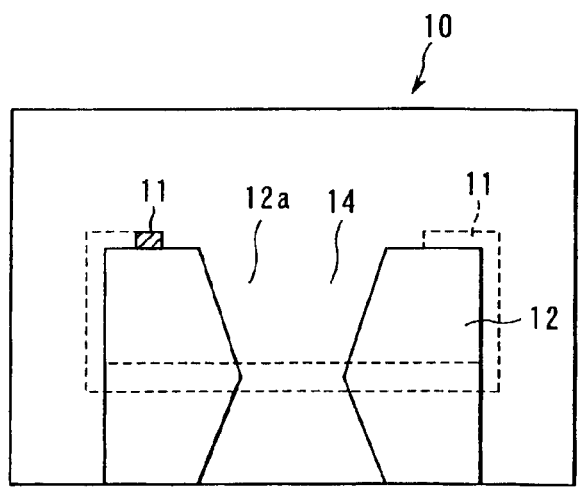
FIG. 24A to FIG. 24C are a sectional view, an upper perspective view, and a back perspective view of the small antenna after secondary molding.
Figure 24B:
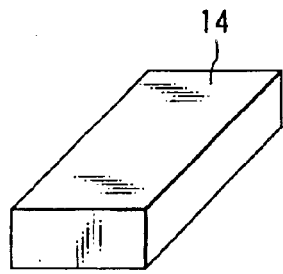
Figure 24C:
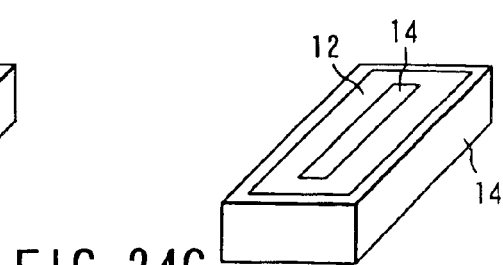

Then, the small antenna 10 shown in FIG. 24A to FIG. 24C is completed by bending the antenna conductor 11 extended out from the first resin 12 as shown in FIG. 24A, and performing secondary molding.

FIG. 24A is a sectional view of the small antenna 10 after the secondary molding. FIG. 24B is an upper perspective view, and FIG. 24C is the rear perspective view.

The small antenna 10 is embedded in the first resin part 12 so that the middle part of the intermediate part along the width direction of the meander antenna conductor 11 is left. Then, both sides along the width direction of the antenna conductor 11 are bent along the surface of the first resin part 12. The middle part of the first resin part 12 is the penetration hole 12a which penetrates to the thickness direction thereof. The second resin part 14 buries the penetration part 12a, and covers the side surface and the upper surface of the first resin part 12.

As described above, the middle part in addition to the both ends along the meander width direction of the antenna conductor 11 is pressed with the mold at the primary molding in the tenth embodiment. As a result, the antenna conductor 11 can endure the resin filling pressure. Therefore, the primary molding goods whose quality becomes complete while controlling the deformation from the initial state can be formed.

(Eleventh Embodiment)

The eleventh embodiment of the present invention will be explained referring to FIG. 25A to FIG. 25C. In the eleventh embodiment, the same marks are fixed to the same parts as the first embodiment, and the detailed explanation will be omitted.

In each above-mentioned embodiment, the antenna conductor 11 is put between the mold 21, and the (first) resin is filled. In this case, to prevent the mold 21 from opening by the filling pressure of the resin, the molds 21 is pressed by considerably large power (for example, several tons). Therefore, there is a fear that the insert frame 11a is crushed by the pressing power of the mold 21 which presses the insert frame 11a.

Figure 25A:
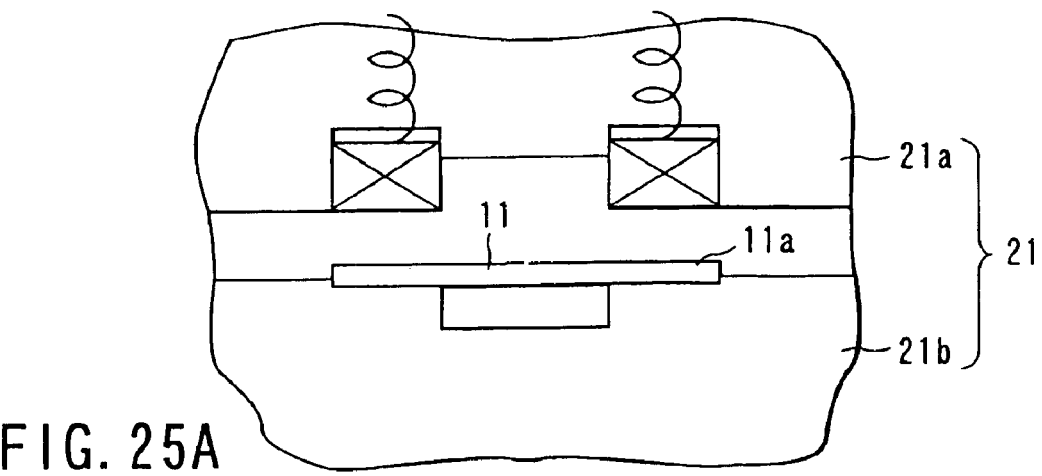
FIG. 25A to FIG. 25C are figures which show the manufacturing method of the small antenna according to the eleventh embodiment.
Figure 25B:
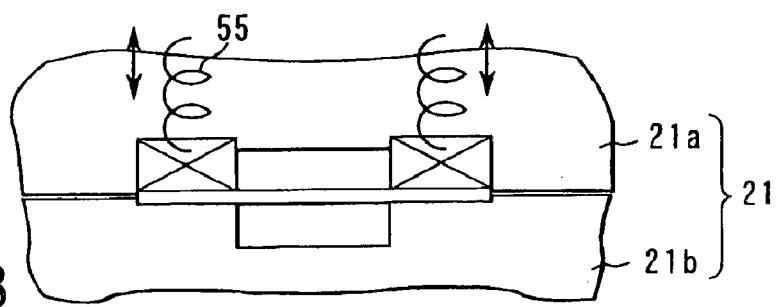
Figure 25C:
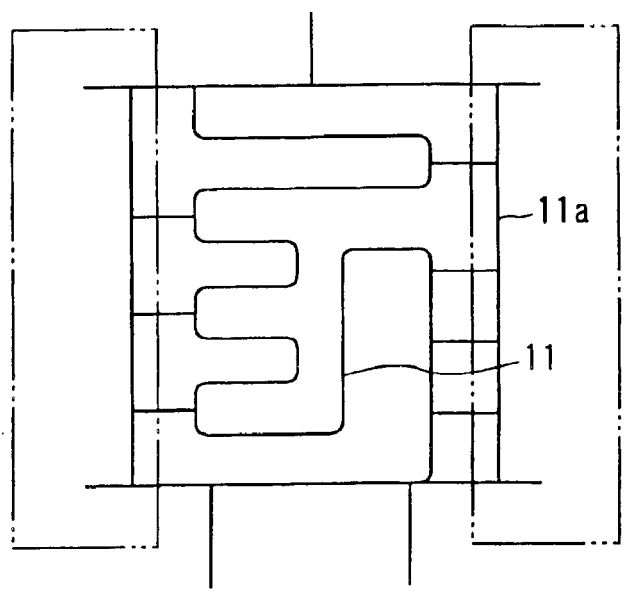

Then, in the eleventh embodiment, the improvement is added to the mold 21, and the insert frame 11a is pressed for example with the pressure material 55 pressed by the elasticity material like the spring as shown in FIG. 25A. Then, the resin is injected into the mold 21 in a state of pressing the insert frame 11a as shown in FIG. 25B. In this case, the part pressed with pressure material 55 is a part of the surround by two-dot chain line of FIG. 25C. In the eleventh embodiment, since the insert frame 11a is pressed by strength which can be endured the filling pressure not strength to crush the insert frame 11a by the mold, the deformation of the antenna conductor 11 at the molding can be controlled.

As described above, the frequency band can be held in the state of the wide band by forming the first resin part 12 with low dielectric material between each conductor of the antenna conductor 11 formed, for example, like the meander. If the second resin part 14 which consists of the high dielectric material is formed on upper and lower surfaces of the antenna conductor 11 and the first resin part 12, the resonance frequency can be lowered by increasing the capacity formed to antenna conductor 11 by the second resin part 14. Therefore, the resonance frequency can be lowered and a wide frequency band can be obtained while miniaturizing the antenna. In addition, since it is possible to perform the resin molding which uses the mold, a small antenna can be easily manufactured. In these embodiments, the deformation of the antenna conductor at the resin molding can also be controlled.

The undermentioned invention and other inventions can be understood from the above-mentioned embodiment.

The small antenna according to the first aspect is characterized by comprising: an antenna conductor; and a dielectric chip formed at surroundings of said antenna conductor by a plurality of resin moldings. More specifically, The small antenna according to the first aspect is characterized by comprising: an antenna conductor; and a first resin part formed to cover a part of said antenna conductor; and a second resin part formed to cover a part which is not covered by said first resin part of said antenna conductor.

With above-mentioned configuration, at the first resin molding, a part of the antenna conductor can be fixed with the mold. Therefore, the deformation of the antenna conductor at the molding processing can be controlled. Therefore, it becomes possible to obtain the small antenna whose antenna characteristic is good, and whose quality becomes complete, and to achieve an easy manufacture and a low cost.

(1) A projection part formed on said first resin part is further provided.

(2) The antenna conductor is a planar type and at least a part of said first resin part is formed at a same position of a front surface and a rear surface of said planar type antenna conductor.

(3) It is preferable to use the conductor formed by a piercing processing from a metallic plate or an etching processing as an antenna conductor. The antenna conductor may be a conductor formed by bending the wire rod.

(4) The antenna conductor is a meander antenna conductor.

With above-mentioned configuration, the first molding resin layer which is formed at the primary molding can be used as a pressure at the secondary molding. Especially, the secondary molding can be performed without independently forming the pressure member.

The small antenna according to the second aspect is characterized by comprising: a meander antenna conductor; a first resin part formed on a part of said antenna conductor along a meander width direction; and a second resin part formed to overlap said first resin part and a part on which said first resin part of said antenna conductor are not formed, in which said first resin part has a projection part formed to project to a side of said second resin part. With this configuration, it is preferable that said projection part has a same height as said second resin part, and is formed to be arranged at least three corners of said second resin part.

The small antenna according to third aspect is characterized by comprising: a meander antenna conductor; a first resin part formed at both ends along a meander width direction of said antenna conductor; and a second resin part formed in an intermediate part along the meander width direction of said antenna conductor. It is possible to integrate and hold both ends of the antenna conductor by providing the first molding resin layer at both ends along the direction of the meander width of the antenna conductor. Therefore, it is possible to perform the secondary molding by controlling the change in intervals of the antenna conductor. As a result, it is possible to obtain the small antenna whose antenna characteristic is good, and whose quality becomes complete.

The small antenna according to fourth aspect is characterized by comprising: a meander antenna conductor; a first resin part formed at both ends along a meander width direction of said antenna conductor; a plurality of projection parts formed on both surfaces of said first resin part; and a second resin part formed on both surfaces including said first resin part of said antenna conductor to become a same surface as said projection part. In the third and fourth aspects, it is preferable that said projection part is formed at four corners of said first resin part or a neighborhood thereof. Since the second molding resin layer is formed by combining with the boss of the first molding resin layer, it is possible to configure the excellent strength antenna.

In the first to fourth aspects, it is preferable that a material whose liquidity is higher than a resin to form said second resin part at a molding is used as a resin to form said first resin part.

The small antenna according to the fifth aspect of present invention is characterized by comprising: an antenna conductor; a first resin part which includes a low dielectric material formed on a side of said antenna conductor; and a second resin part which includes a high dielectric material formed to cover said antenna conductor and said first resin part. More specifically, the small antenna according to the fifth aspect characterized by comprising: a meander antenna conductor; a first resin part which is formed between each conductor of said antenna conductor and includes a low dielectric material; and a second resin part which includes a high dielectric material and is provided on upper and lower surfaces of said antenna conductor and the first resin part.

With above-mentioned configuration, the first resin layer with low dielectric material is formed between each conductor of the antenna conductor. Therefore, the frequency band can be held in the state of the wide band. And, it is possible to lower the resonance frequency to the target value by increasing the capacity formed to the antenna conductor with this second resin layer by forming the second resin layer which consists of the high dielectric material on upper and lower surfaces of the first resin and layer and the antenna conductor. Therefore, the resonance frequency can be lowered to the target value and a wide frequency band can be obtained while miniaturizing the antenna. In addition, since it is possible to perform the resin molding which uses the mold, a small antenna can be easily manufactured.

The first resin layer may be provided to not only between each conductor of the antenna conductor but the surroundings of the antenna conductor.

In the fifth aspect, it is preferable that said first resin part is formed with a low permittivity bonding material, and said second resin part is bonded to said antenna conductor with said bonding material.

With above-mentioned configuration, the resonance frequency can be lowered to the target value and a wide frequency band can be obtained while miniaturizing the antenna as well as the case of the resin molding. In addition, the small antenna can be easily manufactured only with bonding the first and second resin layers to the antenna conductor.

The small antenna according to the sixth aspect of present invention is characterized by comprising: a meander antenna conductor; a first resin part which includes a low dielectric material and is provided between each conductor of said antenna conductor; an integral part provided to project to an upper surface and a lower surface of said first resin part along a pitch direction of said antenna conductor; and a second resin part which includes a high dielectric material and is provided to cover said antenna conductor and said first resin part. The integral molding part may be provided at both sides and/or an intermediate part of the first resin layer for example.

As described above, by providing the integral molding part in which the first resin layer projected to the upper surface or the lower surface along the pitch direction of the antenna conductor, the resin can be spread between antenna conductors through the molding part. As a result, the meander shape of the antenna conductor can be controlled and the deformation from the initial state can be controlled. Therefore, the secondary molding can be processed while controlling causing the difference at intervals of the antenna conductor. As a result, it is possible to obtain the small antenna whose antenna characteristic is good, and whose quality becomes complete. By providing the above-mentioned integral molding part, since the integral molding part can be held with the die faces of the mold, the molding of second becomes easy.

In the sixth aspect, it is preferable that said second resin part is formed to cover said integral molding part in addition to said antenna conductor and said first resin part.

The manufacturing method of the small antenna according to the seventh aspect of present invention is characterized by comprising: putting a part of a antenna conductor between die faces of a first mold; molding a first resin part on said antenna conductor; putting the first resin part of said antenna conductor between die faces of a second mold; molding a second resin part on said antenna conductor.

The manufacturing method of another small antennas according to the seventh aspect of present invention is characterized by comprising: putting a antenna conductor between die faces of a first mold; molding a first resin part on said antenna conductor; forming a pressure projection part on said first resin part; putting said pressure projection part formed on the first resin part of said antenna conductor between die faces of a second mold; and molding a second resin part on said antenna conductor. When the antenna conductor has a meander shape, it is preferable that said part is a part along the meander width direction.

Since a part of the antenna conductor put between the mold at the first resin molding, the deformation of the antenna conductor at the molding can be controlled according to the above-mentioned manufacturing method. Since the secondary molding is performed in a state of putting the molding resin layer of the first resin part between the die faces of the second mold, the position of the primary molding goods is steady. Therefore, a small antenna with high quality and high accuracy can be efficiently manufactured.

The pressure projection may be formed on the first molding resin layer.

It is preferable that a material whose liquidity is higher than a material to form said second resin part at a molding is used as a material to form said first resin part. After the antenna conductor is fixed by first step without impossibility, the molding of the second step can be performed. It is preferable a material whose dielectric is lower than a material to form said second resin part at a molding is used as a material to form said first resin part.

Additionally, it is preferable that at least one of the first mold and the second mold putting said antenna conductor or said first resin part comprises a material applying a pressure which is applied to at least one of said die faces by an elastic material and is carried out to said antenna conductor or said first resin part. Since the power which presses the antenna conductor and the first resin can be adjusted by the elastic force, the antenna conductor and the frame can be prevented from crushing and deforming, for example, by the pressure to hold the antenna conductor, etc.

What is claimed is:

1. A small antenna comprising:

an antenna conductor; and a dielectric chip formed at surroundings of said antenna conductor by a plurality of different molded resin parts, the plurality of different molded resin parts forming one dielectric chip body.

2. The small antenna according to claim 1, wherein said antenna conductor is a meander antenna conductor.

3. A small antenna comprising:

an antenna conductor; and a first resin part formed to cover a part of said antenna conductor; and a second resin part, which is formed contacted with the first resin part and is different from the first resin part, formed to cover a part which is not covered by said first resin part of said antenna conductor.

4. The small antenna according to claim 3, further comprising a projection part formed on said first resin part.

5. The small antenna according to claim 3, wherein said antenna conductor is a planar type and at least a part of said first resin part is formed at a same position of a front surface and a rear surface of said planar type antenna conductor.

6. The small antenna according to claim 3, wherein said antenna conductor is a meander antenna conductor.

7. The small antenna according to claim 3, wherein a material whose liquidity is higher than a resin to form said second resin part at a molding is used as a resin to form said first resin part.

8. A small antenna comprising:

a meander antenna conductor;

a first resin part formed on a part of said antenna conductor along a meander width direction; and a second resin part formed to overlap said first resin part and a part on which said first resin part of said antenna conductor are not formed, wherein said first resin part has a projection part formed to project to a side of said second resin part.

9. The small antenna according to claim 8, wherein said projection part has a same height as said second resin part, and is formed to be arranged at least three corners of said second resin part.

10. The small antenna according to claim 8, wherein said projection part is formed at four corners of said first resin part or a neighborhood thereof.

11. The small antenna according to claim 8, wherein a material whose liquidity is higher than a resin to form said second resin part at a molding is used as a resin to form said first resin part.

12. A small antenna comprising:

a meander antenna conductor;

a first resin part formed at both ends along a meander width direction of said antenna conductor; and a second resin part formed in an intermediate part along the meander width direction of said antenna conductor.

13. The small antenna according to claim 12, wherein a material whose liquidity is higher than a resin to form said second resin part at a molding is used as a resin to form said first resin part.

14. A small antenna comprising:

a meander antenna conductor;

a first resin part formed at both ends along a meander width direction of said antenna conductor;

a plurality of projection parts formed on both surfaces of said first resin part; and a second resin part formed on both surfaces including said first resin part of said antenna conductor to become a same surface as said projection part.

15. The small antenna according to claim 14, wherein said projection part is formed at four corners of said first resin part or a neighborhood thereof.

16. The small antenna according to claim 14, wherein a material whose liquidity is higher than a resin to form said second resin part at a molding is used as a resin to form said first resin part.

17. A small antenna comprising:

an antenna conductor;

a first resin part which includes a low dielectric material formed on a side of said antenna conductor; and a second resin part which includes a high dielectric material formed to cover said antenna conductor and said first resin part.

18. The small antenna according to claim 17, wherein said first resin part is formed with a low permittivity bonding material, and said second resin part is bonded to said antenna conductor with said bonding material.

19. A small antenna comprising:

a meander antenna conductor;

a first resin part which is formed between each conductor of said antenna conductor and includes a low dielectric material; and a second resin part which includes a high dielectric material and is provided on upper and lower surfaces of said antenna conductor and the first resin part.

20. The small antenna according to claim 19, wherein said first resin part is formed with a low permittivity bonding material, and said second resin part is bonded to said antenna conductor with said bonding material.

21. A small antenna comprising:

a meander antenna conductor;

a first resin part which includes a low dielectric material and is provided between each conductor of said antenna conductor;

an integral part provided to project to an upper surface and a lower surface of said first resin part along a pitch direction of said antenna conductor; and a second resin part which includes a high dielectric material and is provided to cover said antenna conductor and said first resin part.

22. The small antenna according to claim 21, wherein said second resin part is formed to cover said integral molding part in addition to said antenna conductor and said first resin part.

23. A manufacturing method of a small antenna comprising:

putting a part of a antenna conductor between die faces of a first mold;

molding a first resin part on said antenna conductor;

putting the first resin part of said antenna conductor between die faces of a second mold;

molding a second resin part on said antenna conductor.

24. The manufacturing method of a small antenna according to claim 23, wherein a material whose liquidity is higher than a material to form said second resin part at a molding is used as a material to form said first resin part.

25. The manufacturing method of a small antenna according to claim 23, wherein a material whose dielectric is lower than a material to form said second resin part at a molding is used as a material to form said first resin part.

26. The manufacturing method of small antenna according to claim 23, wherein at least one of the first mold and the second mold putting said antenna conductor or said first resin part comprises a material applying a pressure which is applied to at least one of said die faces by an elastic material and is carried out to said antenna conductor or said first resin part.

27. A manufacturing method of the small antenna comprising:

putting a antenna conductor between die faces of a first mold;

molding a first resin part on said antenna conductor;

forming a pressure projection part on said first resin part;

putting said pressure projection part formed on the first resin part of said antenna conductor between die fares of a second mold; and molding a second resin part on said antenna conductor.

28. The manufacturing method of a small antenna according to claim 27, wherein a material whose liquidity is higher than a material to form said second resin part at a molding is used as a material to form said first resin part.

29. The manufacturing method of a small antenna according to claim 27, wherein a material whose dielectric is lower than a material to form said second resin part at a molding is used as a material to form said first resin part.

30. The manufacturing method of small antenna according to claim 27, wherein at least one of the first mold and the second mold putting said antenna conductor or said first resin part comprises a material applying a pressure which is applied to at least one of said die faces by an elastic material and is carried out to said antenna conductor or said first resin part.

* * * * *

UNITED STATES PATENT AND TRADEMARK OFFICE
CERTIFICATE OF CORRECTION

PATENT NO. : 6,917,345 B2
DATED : July 12, 2005
INVENTOR(S) : Hamada et al.

It is certified that error appears in the above-identified patent and that said Letters Patent is hereby corrected as shown below:

Column 19,
Line 10, after "part of" delete "a" and insert therefore -- an --.

Column 20,
Line 10, delete "fares" and insert therefore -- faces --.

Signed and Sealed this

Twenty-second Day of November, 2005

JON W. DUDAS
*Director of the United States Patent and Trademark Office*